(12) United States Patent
Li et al.

(10) Patent No.: US 10,242,034 B1
(45) Date of Patent: Mar. 26, 2019

(54) INTELLIGENT SELECTION OF IMAGES TO CREATE IMAGE NARRATIVES

(71) Applicant: Amazon Technologies, Inc., Seattle, WA (US)

(72) Inventors: Yi Li, Seattle, WA (US); Yuxin Wu, Seattle, WA (US); Yushan Chen, Seattle, WA (US); Meng Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 406 days.

(21) Appl. No.: 14/980,775

(22) Filed: Dec. 28, 2015

(51) Int. Cl.
*G06F 17/30* (2006.01)
*G06K 9/00* (2006.01)

(52) U.S. Cl.
CPC .. *G06F 17/30268* (2013.01); *G06F 17/30867* (2013.01); *G06K 9/00288* (2013.01)

(58) Field of Classification Search
CPC ................................................ G06K 9/00677
USPC .......... 707/696; 382/170, 305; 282/170, 305
See application file for complete search history.

(56) References Cited

U.S. PATENT DOCUMENTS

| | | | | |
|---|---|---|---|---|
| 8,847,739 B2* | 9/2014 | Wilson | ............... | G06F 3/046 340/10.1 |
| 2009/0290812 A1* | 11/2009 | Naaman | ............ | G06F 17/30241 382/305 |
| 2010/0250601 A1* | 9/2010 | Takata | ............... | G06F 17/30265 707/780 |
| 2011/0150340 A1* | 6/2011 | Gotoh | ............... | G06F 17/30247 382/190 |
| 2012/0219191 A1* | 8/2012 | Benzarti | ............ | G06Q 30/0201 382/106 |
| 2013/0222133 A1* | 8/2013 | Schultz | .................. | G08G 1/205 340/539.13 |
| 2014/0002342 A1* | 1/2014 | Fedorovskaya | ... | G06F 17/30247 345/156 |
| 2014/0129981 A1* | 5/2014 | Soderberg | ......... | G06F 17/30265 715/810 |
| 2014/0324823 A1* | 10/2014 | Iorio | .................. | G06F 17/30268 707/722 |
| 2016/0196350 A1* | 7/2016 | Mau | .................. | G06F 17/30256 707/706 |
| 2017/0351934 A1* | 12/2017 | Ruan | ................... | G06F 17/2765 |

* cited by examiner

Primary Examiner — Baoquoc N To
(74) Attorney, Agent, or Firm — Lee & Hayes, P.C.

(57) ABSTRACT

Images are intelligently selected to create image narratives. Instead of a user having to manually search and locate images to view, the images to associate with a particular image narrative are programmatically determined. Many different types of image narratives may be created. For example, one image narrative may show images that include both a first user and a second user over some period of time. Another image narrative may show images that relate to an activity that a first user enjoys or an event that included the user (e.g., a graduation). The tags and metadata associated with the images of the user are analyzed to determine the tags that are important to the user. For example, the importance might be determined based on the frequency of the tags within the images. After creation, the user may select one of the image narratives to view the associated images.

20 Claims, 17 Drawing Sheets

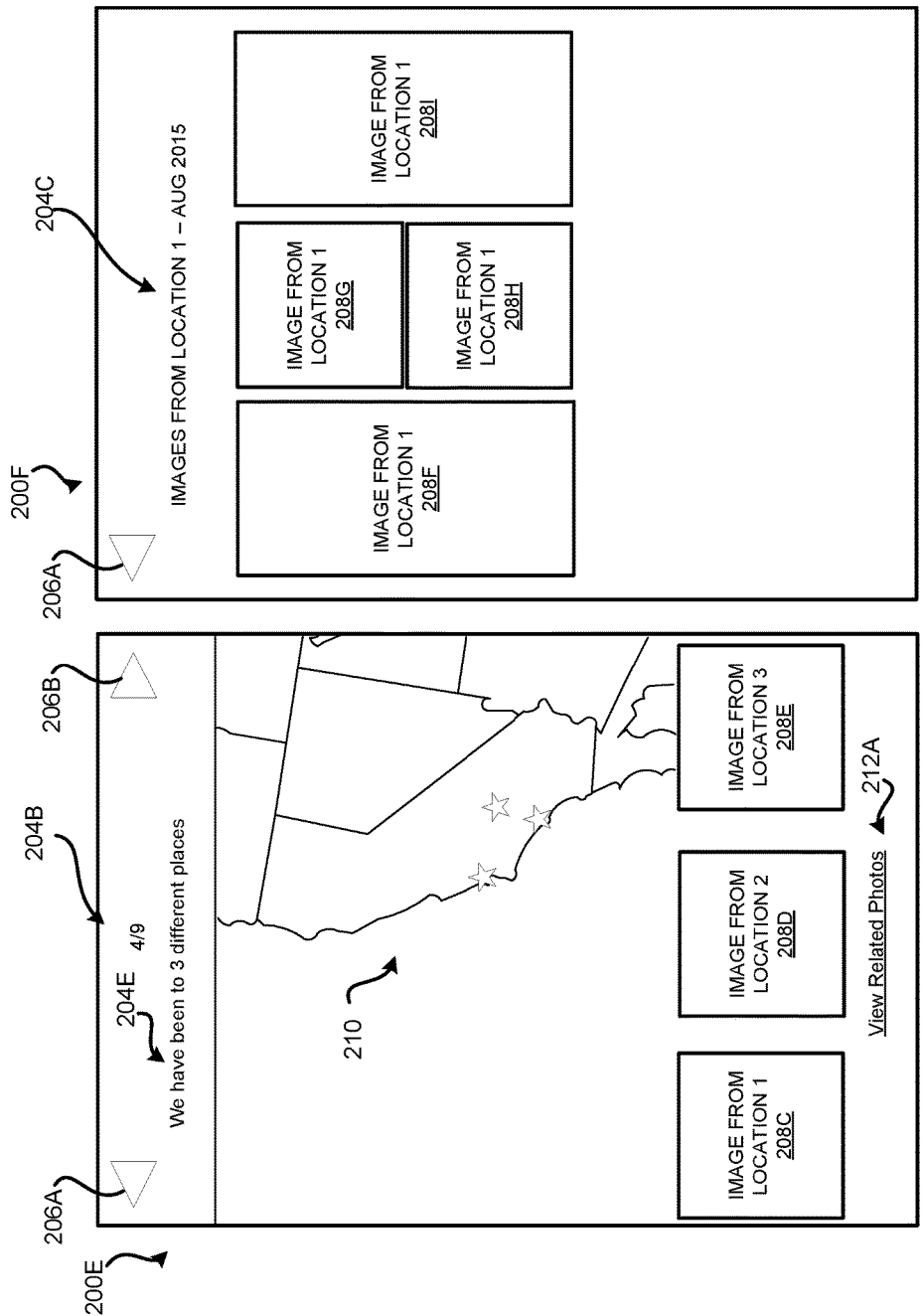

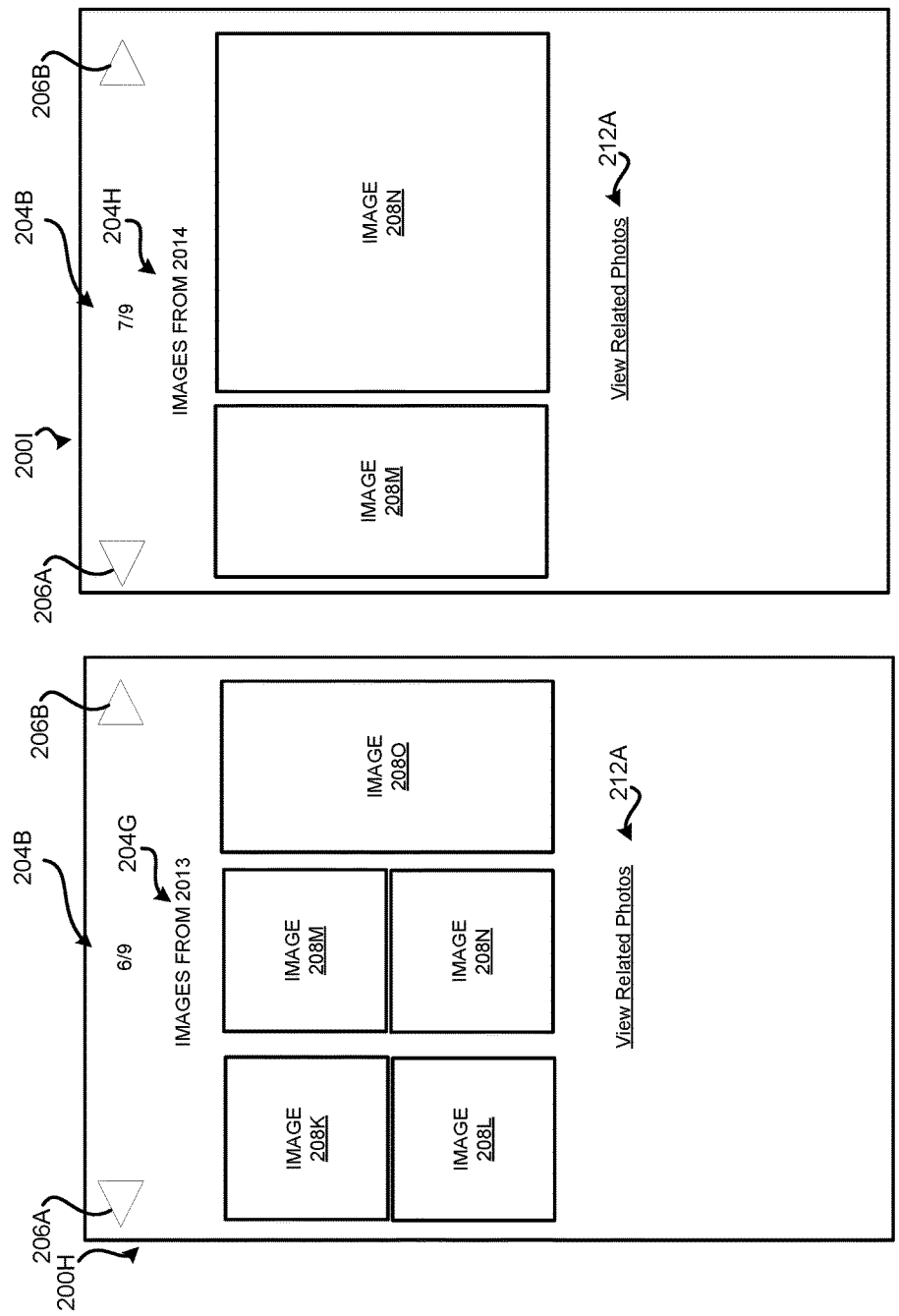

US 10,242,034 B1

INTELLIGENT SELECTION OF IMAGES TO CREATE IMAGE NARRATIVES

BACKGROUND

Today, users are able to quickly capture, share, and store digital images. For example, users may take images of vacations, friends, favorite meals, must-have items, business cards, documents, as well as images of other types of content. Having a smartphone equipped with a camera readily available allows users to create digital images of virtually anything, anytime, and anywhere.

While smartphones have revolutionized the taking of images, in both content and quantity, the way those images are managed and organized has hardly kept pace. Many users have collected thousands or even tens of thousands of moments and memories, yet these images are typically just saved to random, disorganized "albums" on their smartphones, on social media or in cloud storage. This scattered and disorganized system has made it difficult to find and look back at old images.

BRIEF DESCRIPTION OF THE DRAWINGS

FIGS. 2A, 2B, 2C, 2D, 2E, 2F, 2G, 2H, 2I, 2J, and 2K are screen diagrams showing illustrative graphical user interfaces ("GUIs") that display data related to an exemplary image narrative;

DETAILED DESCRIPTION

Figure 1:
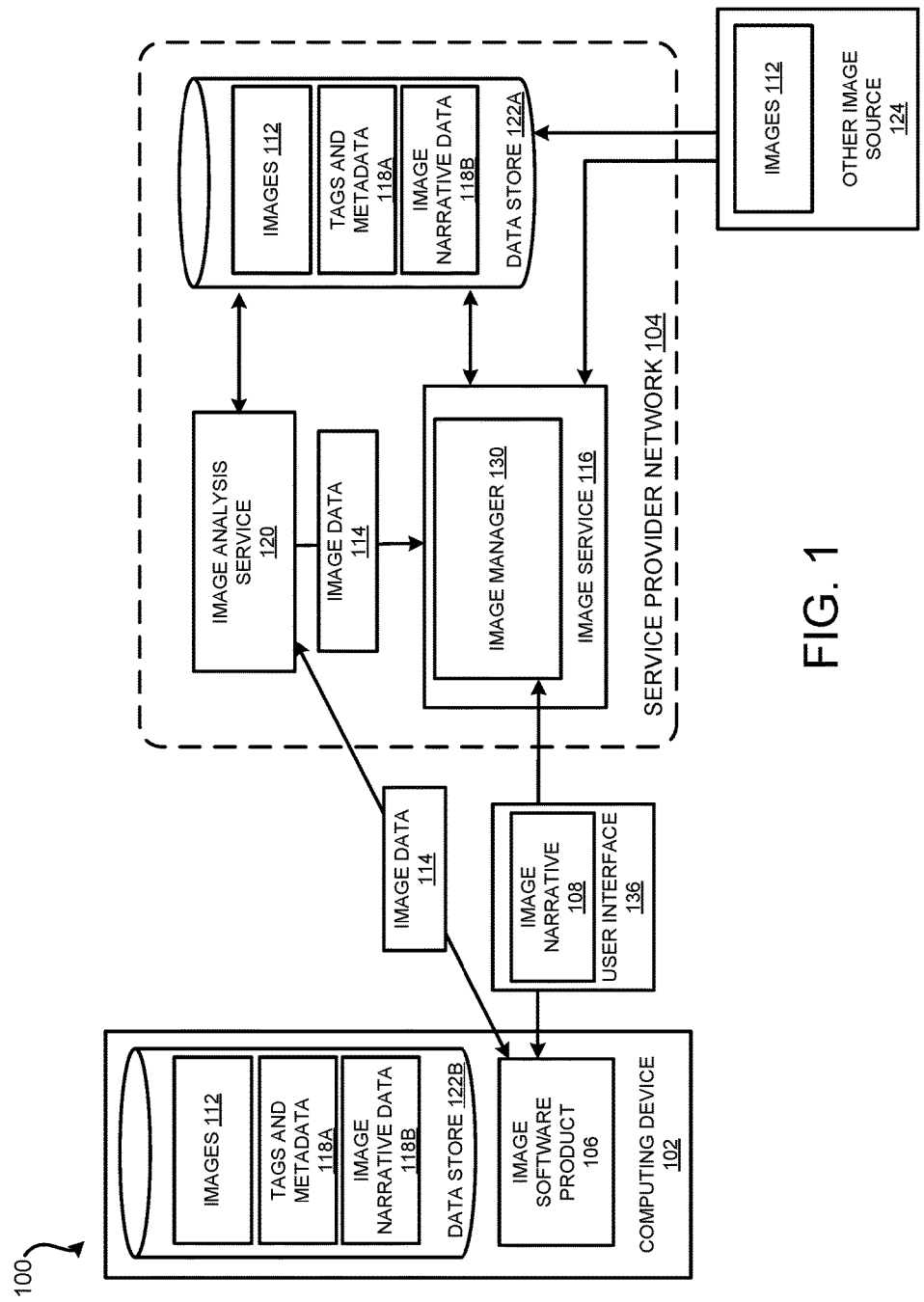
FIG. 1 is a block diagram depicting an illustrative operating environment in which image narratives are created using tags and metadata associated with images.

The following detailed description is directed to technologies for the intelligent selection of images to create image narratives. As discussed above, while users can take, acquire, and store a large number of digital images, accessing these images at later points in times has proven difficult. Using technologies described herein, instead of a user having to manually search and locate images to view, the user may select an image narrative that includes images of the user that were programmatically determined to be of interest to the user. As used herein, "image narrative" may refer to a collection of digital images determined to be related to each other and of interest to a user.

Many different types of image narratives may be created on behalf of a user. For example, one image narrative may consist of images that include both the user and another user (e.g., a good friend) over some period of time (e.g., the previous year). In this example, the image narrative might provide the user with data indicating the number of images that include the friend that were taken within the last year, locations where the images were taken in the last year (e.g., different cities), as well as representative images that are associated with the locations. The image narrative might also provide other information to the user such as, but not limited to, information identifying other friends that are commonly included in the images, information about the visited locations, and the like. In some configurations, the images of an image narrative may be presented in narrative form, such as according to time (e.g., every month or year) and/or location.

Another image narrative that may be created for a user may show images of the user that relate to an activity that the user participates in that is based on an analysis of the images of the user. For example, the image narrative may show images taken by the user that are identified as being associated with an activity (e.g., hiking) that the user frequently participates in during some period of time (e.g., the last year, the last two years).

Yet another type of image narrative that may be created includes images that are associated with an event that is determined to be significant of and/or of interest to a user. For instance, image narratives may be created for each significant event that occurred during the last year. These events might include, but are not limited to weddings, birthdays, graduations, ceremonies, parties, holidays, and the like. Other image narratives may also be created for a user. In some examples, an image narrative may be created based on input received from a user. For example, a user may specify one or more keywords (e.g., tags) that may be used to generate an image narrative. As an example, a user may input the name of a person and a location to have an image narrative created using images that include the person at the specified location. Generally, the image narratives that are created for a user are based on items determined to be of interest to the user based on an analysis of the images.

According to some configurations, the tags and metadata associated with the images of the user are programmatically analyzed to determine the images that are of interest to the user. For example, the interest of a particular individual, group of individuals, locations, activities, animals, scenery, or the like, might be determined based on the frequency of the tags identified from the images. In some examples, the tags may be sorted based on the number of occurrences of the tags (e.g., from most occurring tags to least occurring tags).

The tags that occur the most often (e.g., a particular face, location, activity, scene, animal) may be considered important or of particular interest to the user. In some instances, the analysis of the tags and the metadata may identify a combination of tags that are of interest to the user. For example, the analysis of the tags and metadata may reveal that the user commonly participates in tennis with the same individual (e.g., a friend) and that the user and the friend travel to different locations to play tennis.

The items that are of interest to the user might also be identified based on input provided from the user. For example, if the user creates new tags, or modifies existing tags, these tags may be more determined to be of more importance or interest to the user as compared to tags the user does not create or modify. In other configurations, a machine learning mechanism may be used to determine the tags that are of interest to a user.

The images might also be analyzed to determine other information about the user. For example, if the tags indicate a large percentage of the images are related to outdoor adventure (e.g., mounting climbing, kayaking), the user may be identified as an outdoor adventurer and one or more image narratives may be created for the outdoor adventures. As another example, the tags and metadata may indicate that the user is an animal lover, likes primarily spending time with family, likes participating in a particular activity, or the like. The analysis of the images might also be used to determine how long a particular individual has been a friend of the user. For instance, one individual may be recognized in images from the present to five years ago, whereas another individual may be recognized in images from the present to three years ago.

The analysis of the images may also determine where and how often the user has traveled, who the user traveled with or visited, and the like. The tags might also be used to identify family and friends that are important to the user. For example, the analysis of the images may identify the faces of individuals within the images and determine the individuals that are most often included in the images. The more frequently an individual is included in the images and the length of time the user has been included in the images may provide an indication of a friendship between the user and the individual. As can be seen, many different types of information may be determined from the analysis of the images.

After creation, the user may select one of the image narratives to view. In some examples, the image narratives are represented by user interface elements within a graphical user interface ("GUI"). For instance, the GUI might include a user interface element for one image narrative that includes images of the user and a friend, another user interface element for an image narrative that highlights an activity that the user commonly participates in, another user interface element for an image narrative that includes images of a pet of the user, and the like.

In response to selecting one of the image narratives, the user is provided with a display of images and information about the images for the selected image narrative. Additional details regarding the various components and processes described above relating to the intelligent selection of images to create image narratives will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which image narratives are created using tags and metadata associated with images of a user. As illustrated in FIG. 1, the operating environment 100 includes one or more computing devices 102 in communication with a service provider network 104.

A user may interact with the service provider network 104 using a computing device, such as the computing device 102. The computing device 102 may be computer, such as a desktop or a mobile computing device (e.g., a tablet or smartphone computing device). In some configurations, the computing device 102 may be connected to a television or some other display device. For instance, the computing device may be a dongle device that connects to a port of a television.

In some examples, an application, such as an image software product 106 executing on the computing device 102 communicates with the service provider network 104. As used herein, the term "software product" may refer to software and/or software services. For example, a software product may be an application, a machine image, or software as a service ("SaaS"). The software product may be available from an electronic marketplace and may be executed on a customer computing device and/or within a service provider network or some other network.

In other examples, the image software product 106 may be executed within the service provider network (not shown) on behalf of the user. For example, the software product 106, or some other software product 106, may be executed on computing resources provided by the service provider network 104. The user of computing device 102 may be a customer of the service provider network. As used herein, the terms "customer" and "customers" refer to existing customers of the electronic marketplace 108 provided by the electronic marketplace environment 106 and/or the service provider network 104 as well as visitors (i.e. potential customers) to the electronic marketplace 108 and/or the service provider network 104.

As described in more detail below, the service provider network 104 may include a collection of rapidly provisioned and, potentially, released computing resources hosted in connection with the electronic marketplace or a third party provider. The computing resources may include a number of computing, networking and storage devices in communication with one another. In some examples, the computing resources may correspond to physical computing devices. In other examples, the computing resources may correspond to virtual machine instances implemented by one or more physical computing devices. In still other examples, computing resources may correspond to both virtual machine instances and physical computing devices.

As illustrated, the service provider network 104 includes an image service 116, an image analysis service 120, and a data store 122A. While the image service 116, the image analysis service 120, and the data store 122A are illustrated within the service provider network 104, one or more of these services and data store may be located in other locations. For example, some or all of the functionality of the image service 116 and/or the image analysis service 120 may be performed on the computing device 102 and/or on some other computing device.

According to some configurations, the image analysis service 120 analyzes the images 112 that are associated with a particular user. For example, the images 112 may be digital images that were taken by the user and/or shared with the user. In some examples, the images 112 for a user may be obtained in other ways. For example, from some other image source. In other configurations, the analysis of the images 112 may be performed on some other computing device, such as the computing device 102. The images 112 of a user may be stored on the data store 122B on the computing device 112, the data store 122A within the service provider network 104, and/or on some other image data source 112. For example, the other image source 124 may be a social media service (e.g., the FACEBOOK social media service) or some other data store (e.g., the DROPBOX file storage service). In some examples, the images 112 may be obtained from video of the user (e.g., taken by a smartphone or camera of the user).

A digital image, such as one of the images 112, often includes an associated set of metadata (meaning data about the image). For example, a digital image 112 may include, but is not limited to the following metadata: title; subject; authors; date acquired; copyright; creation time—time and date when the image is taken; focal length (e.g., 4 mm); 35 mm focal length (e.g., 33); dimensions of the image; horizontal resolution; vertical resolution; bit depth (e.g., 24); color representation (e.g., sRGB); camera model (e.g., iPhone 6); F-stop; exposure time; ISO speed; brightness; size (e.g., 2.08 MB); GPS (Global Positioning System) latitude (e.g., 42; 8; 3.00000000000426); GPS longitude (e.g., 87; 54; 8.999999999912); and GPS altitude (e.g., 198.36673773987206). The GPS latitude, longitude and altitude may also be referred to as a "GeoTag" that identifies the geographical location (or geolocation for short) of the camera that took the picture and usually the objects within the image when the image is taken. An image or video with a GeoTag is said to be "geotagged." In a different implementation, the GeoTag is one of the tags embedded in the image by the image analysis service 120 and/or some other component or computing device.

The images 112 can also include one or more tags embedded in the image, or possibly stored separately from the image, as metadata. The tags describe and indicate the characteristics of the image. For example, a "family" tag indicates that the image is a family image, a "wedding" tag indicates that the image is a wedding image, a "subset" tag indicates that the image is a sunset scene image, a "Santa Monica beach" tag indicates that the image is a taken at Santa Monica beach, etc. In some examples, each recognized item within the image may include a tag. There may be thousands of different tags. In some cases, a user may modify and/or create tags. For example, user tags may be used to identify recognized individuals in the images 112, other tags may identify particular animals in the images 112, other tags may identify objects within the images (e.g., cars, buildings, tables, chairs).

In some examples, the image analysis service 120 may be configured to generate the tags from the images. For example, the image analysis service 120 may extracts or retrieves the metadata and tags from all or a portion of the images. For example, a piece of software program code written in a computer programming language (e.g., C#) can be used to read the metadata and tags from the images. In some examples, the image analysis service 120 may change the tags. For example, both "dusk" and "twilight" tags are changed to "sunset." As also discussed herein, the image analysis service 120 may generate additional tags for all or a portion of the images. For example, a location tag may be generated from the GeoTag in an image. In some examples, the image analysis service 120 sends the GPS coordinates within the GeoTag to a map service server requesting for a location corresponding to the GPS coordinates. For example, the location may be identified as "Santa Monica Beach" or "O'Hare Airport." The name of the location is then regarded as a location tag for the image.

According to some configurations, the image analysis service 120 generates tags based on results of scene understanding and/or facial recognition that are performed on each image 112. For example, the image analysis service 120 may determine the scene type (such as beach, sunset, etc.) for each image 112 that is analyzed. The scene type determined by the image analysis service 120 may then be used as an additional tag (i.e., a scene tag) for the image 112.

In some examples, the image creation time determined from the metadata associated with the image 112 may be used to assist scene understanding. For example, when the scene type is determined to be "beach" and the creation time is 6:00 PM for an image, both beach and sunset beach may be tags for the scene types of the image 112. As an additional example, a dusk scene image and a sunset scene image of a same location or structure may appear to be similar. In such a case, the image creation time helps to determine the scene type, i.e., a dusk scene or a sunset scene.

The date of the creation time and geolocation of the image may also be considered in determining the scene type. For example, the sun disappears out of sight from the sky at different times in different seasons of the year. Moreover, sunset times are different for different locations. Geolocation can further assist in scene understanding in other ways. For example, an image 112 of a big lake and an image 112 of a sea may look very similar. In such a case, the geolocations of the images may be used to distinguish a lake image from an ocean image.

The image analysis service 120 may also perform facial recognition to recognize faces and determine facial expressions of individuals within the images 112. In some examples, different facial images (such as smile, angry, etc.) are identified and used to create one or more emotion tags for the individual within the image. The image analysis service 120 may add one or more emotion tags (e.g., happy, sad, crying, laughing, smiling, frowning) to each image. For example, when a person in an image is determined to be smiling, the image analysis service 120 adds a "smile" tag to the image. The "smile" tag is a facial expression or emotion type tag.

The image analysis service 120 may also generate an event tag for special days and/or events. For example, when the creation time of the image is on a recognized holiday (e.g., July 4th or December 25$^{th}$), a "July 4th" tag or a "Christmas" tag may be generated by the image analysis service 120. The creation time might also be used to identify a special event for the user. For example, the event might be a birthday, a wedding, a graduation, or the like. In some configurations, the image analysis service 120 may access calendar data for the user (or other users recognized within the image 112) to determine whether that day is associated with an event identified by the user. In other examples, the image analysis service 120 may analyze the image 112 and determine that the image is associated with a particular event. For instance, the image analysis service 120 may recognize graduation hats and robes in the images 112 and determine that the image relates to a graduation. In this example, the image analysis service 120 may generate a "graduation" event tag. In addition, the image analysis service 120 may use any combination of geolocation, a particular date, and image analysis to determine a particular event and tag the image accordingly. For example, if the image analysis service 120 determines using the geolocation data that an image was taken in Woodstock, N.Y., it may then also look at when the image was taken. The image analysis service 120 may then determine, for example by using a provided calendar or network accessible resources (e.g., the Internet), that a music concert event was happening in Woodstock, N.Y. when and where the image was taken. Furthermore, the image analysis service 120 may use image analysis to also determine indicators associated with a concert, for example large crowds of people, stages, or musical instruments. Any combination of these may then be used to associate that image with an event tag, such as "Woodstock Music Concert."

According to some examples, the image analysis service 120 may associate a confidence level or rating for the generated tags. A confidence level for a tag may indicate how likely a particular tag identifies a characteristic within an image. For example, a "tennis racquet" tag that has an associated confidence level of 0.7 (out of 1) for an object within an image is more likely to be a tennis racket as compared to a tennis racquet tag that has a confidence level of 0.5 for an object in another image, or possibly the same image. In some configurations, a tag added or edited by a user can be associated with a high confidence level (e.g., 1 out of 1) by the image analysis service 120.

In other configurations, the image analysis service 120 may receive tags entered and/or modified by a user. For example, the image analysis service 120 may provide a web page interface, such as user interface 136 that allows a user to tag an image by entering new tags and/or modify existing tags of the images 112. The tags associated with an image 112 may be stored within a data store, such as data store 122A and/or 122B. In other examples, the tags might be stored as part of the image file for the images 112.

According to some examples, the image analysis service 120 within the service provider network 104 may not have access to the images 112 of a user. For instance, the images 112 may be stored on the computing device 102. In this case, the image software product 106 might provide image data 114 to the image analysis service 120. The image data 114 might include metadata and tags for the images. In other cases, the image data 114 might be thumbnails for the images 112 that may be analyzed by the image analysis service 120. In yet other examples, the image data 114 might include other information about the images 112. In some configurations, the image analysis service 120 may maintain a unique identifier for each image that may be used to locate the metadata and tags of the corresponding image within the data store 122B, or some other location.

In some examples, the image analysis service 120 indexes the images using the generated tags and/or metadata. Furthermore, the images 112 may be categorized by scene types, such as a beach resort or a river. In some examples, the image analysis service 120 accesses social networking web page(s) of a user and analyzes the images 112 of the user that are included within the web page(s). In some examples, the data specifying how the images 112 are categorized may be stored as image narrative data 118B within the data store 122A or the data store 122B.

After the tags and/or metadata have been generated for the images 112, the image service 116 and/or the image analysis service 120 may generate image narratives, such as image narrative 108 for use by a user. An image narrative 108 may allow a user to view images 112 that they normally would not have located on their own. Instead of a user having to manually search and locate images to view, the user may select an image narrative 108 generated by the image service 116 that includes images of the user that were programmatically determined to be of interest to the user. In some configurations, the data specifying the created image narratives 108 may be stored as image narrative data 118B within the data store 122A, the data store 122B or some other data store.

According to some configurations, after the image analysis service 120, or some other computing device or service has generated and/or obtained the tags and metadata 118A associated with the images of the user, the tags and metadata 118A for the images 112 are analyzed to determine the tags that are of interest to the user. For example, the interests of a particular individual, group of individuals, locations, activities, animals, scenery, or the like, might be determined based on the analysis of the tags identified from the images. In some configurations, the image analysis service 120 and/or the image manager 130 may store, or index, the tags based on the number of occurrences of the tags (e.g., from most occurring tags to least occurring tags), the confidence level of the tags, a time frame associated with the tags, events, activities, or the like.

In some examples, the image analysis service 120 identifies the tags that occur the most often (e.g., a particular face, location, activity, scene, animal) and designates these tags to be of importance or of particular interest to the user. In some instances, the image analysis service 120 may identify a combination of tags that are of interest to the user. For example, the analysis of the tags and metadata 118A by the image analysis service 120 may reveal that some of the analyzed images include a common activity and common individuals. The image analysis service 120 can also identify images 112 that are interest to a user within some period of time. For example, the image analysis service 120 may identify a "new" friend based on an identification that the new friend is identified in recent pictures (e.g., the last few months) but is not tagged in older images. The time period may also relate to some time near an event or activity that is of interest to a user. For example, the image analysis service 120 may identify the images taken a few hours before a baseball game to a few hours after a baseball game (or longer or shorter) and analyze those images for individuals that are included within the images. As another example, the image analysis service 120 may identify the images taken by a user while traveling. The travel period can be identified by the image analysis service 120 based on a location associated with the images and/or some other source. For instance, the image analysis service 120 may access a calendar, a trip application, or some other data source (when authorized) to identify a duration of an event or some other activity.

In yet other examples, the image analysis service 120 may obtain input from a user to determine the tags of interest to the user. For example, the image manager 130 may receive one or more keywords, or some other type of user selection, that indicate a subject of an image narrative. As an example, a user may specify for the image manager 130 to generate an image narrative that includes images related to one or more keywords supplied by the user. According to some configurations, the user provides the image manager 130, via the image software product 106, tags to include within the generated image narrative. After receiving the selection of the tags, the image manager 130 may identify the images 112 including the tags, and generate an image narrative as described in more detail below. Generally, the image manager 130 may identify representative images from the images 112 that include the tags provided by the user, and associate the identified images with the image narrative.

In some configurations, the image manager 130 and/or the image analysis service 120 weights tags that are generated and/or modified by the user more heavily as compared to other tags that were not modified by the user when determining the importance of tags for a user. For example, if the user creates new tags as described above, or modifies existing tags, these tags may be determined to be of more importance or interest to the user as compared to tags the user does not create or modify. In other configurations, a machine learning mechanism may be used to determine the tags that are of interest to a user.

The tags and/or metadata associated with the images 112 might also be analyzed by the image analysis service 120, the image service 116, or some other component or device to determine information about the user. For example, if the tags indicate a large percentage of the images are related to outdoor adventure (e.g., mounting climbing, kayaking), the user may be identified as an outdoor adventurer and one or more image narratives may be created for the outdoor adventures. The tags of images that are associated with an activity or event may be analyzed by the image analysis service 120 to identify the friends that participate in the activity or event with the user. For example, the image analysis service 120 can identify that one friend participates in tennis with the user but is not included in other images of the user based on an analysis of the tags for the images that include the activity tag.

As another example, the tags and metadata 118A may indicate that the user is an animal lover, likes primarily spending time with family, likes participating in a particular activity, or the like. The analysis of the images might also be used to determine how long a particular individual has been a friend of the user. For instance, one individual may be recognized in images from the present to five years ago, whereas another individual may be recognized in images from the present to three years ago.

The image analysis service 120 and/or the image service 116 can analyze the tags and metadata 118A to determine information such as the location where a user traveled, how often the user has traveled, who the user traveled with or visited, and the like. The tags can be analyzed by the image analysis service 120 to determine the family and friends that are important to the user. For example, the analysis may identify the faces of individuals within the images and determine the individuals that are most often included in the images. The more frequently an individual is included in the images and the length of time the user has been included in the images may provide an indication of a friendship between the user and the individual. As discussed above, the frequency of an occurrence of tags within a particular time period may also be used by the image analysis service 120 and/or the image service 116 to identify friends or individuals that may have been involved with the user for some period of time, but no longer are, or are new friends.

Based on the analysis of the tags and metadata 118A for the images 112, the image manager 130 may create one or more image narratives 108. As discussed above, many different types of image narratives 108 may be created for a user. Another image narrative may be related to an activity enjoyed by the user. Other image narratives may include images for events in which the user participated. For instance, image narratives may be created for each significant event that occurred during the last year. These events might include, but are not limited to weddings, birthdays, graduations, ceremonies, parties, holidays, and the like. Other image narratives may also be created for a user. Generally, the image narratives that are created for a user are based on items determined to be of interest to the user.

As an example, one image narrative 108 that may be created by the image manager 130 may include images of the user and a friend. In this example, the image manager 130 may associate the images 112 that include both the user and the friend. In some cases, the image manager 130 may identify the individual that most frequently occurs in the images 112 along with the user. In some examples, the image manager 130 may associated the images 112 that include both the user and the friend within some time period (e.g., the last six months, the last year, the time around some event or activity). According to some configurations, the image manager 130 may use a scoring mechanism to identify images to include within a particular narrative. For example, the image manager 130 may weight tags of friends that are more frequently occurring within recent images of the user higher than tags of friends that may be more frequently occurring over some other period of time. Similarly, tags of items that frequently occur that are associated with an event or activity may be weighted more heavily when creating an image narrative for the event or activity as compared to images that include those tags but are not associated with the event or activity In some examples, the image manager 130 can weight tags based on the confidence level of the tags. For instance, the image manager 130 may weight tags that have a confidence level above some threshold (e.g. higher than 50%) a same weight and weight tags below the threshold at some other value (e.g. a sliding weight or possibly not even consider). After identifying the friend, or friends to include within this particular type of image narrative 108, the image manager associates the image 112 with the image narrative. For instance, the image manager 130 may store references to each of the images 112 that include a user tag for the user and a user tag for the friend.

According to some configurations, the image manager 130 generates information related to the image narratives 108. For example, the image manager 130 may determine and associate within a particular image narrative, information such as, but not limited to how information indicating the number images that have been taken that include a subject of the particular image narrative (e.g., a friend, an activity, an event), indicating the friends that are commonly included in the images associated with the image narrative 108, information about the visited locations, and the like. In some examples, the image narrative 108 uses the image metadata to determine the locations as well as other information. In some configurations, the images of an image narrative 108 may be arranged by the image manager 130 in narrative form, such as according to time (e.g., every month or year) and/or location. The image manager 130 may determine the time of a photo based on the creation time of the image and/or other metadata (e.g., when a particular image was posted on a social media site).

After creation of the image narratives 108 by the image manager 130, or some other component or device, the image manager may generate a GUI that includes user interface ("UI") elements to represent the available image narratives 108 to view. For instance, the GUI might include a user interface element for an image narrative between the user and another user, another user interface element for an activity that the user commonly participates in, another user interface element for an image narrative that is related to a pet of the user, and the like. In some examples, the image manager 130 provides the GUI for presentation in the user interface 136. In other examples, the image software product 106 may generate the GUI for presentation on a display, such as a display of the computing device 102.

After presentation of the GUI, the user may select one of the image narratives. In response to the selection, the image software product 106 and/or the image service 116 may display the selected image narrative 108 to the user. In some configurations, the GUI may be used by the user to select tags to be used to generate an image narrative. In some examples, the images 112 associated with the selected image narrative 108 are obtained from the data store 122B that is located on the computing device 102. In other examples, the images 112 associated with the image narrative 108 might be obtained from some other location, such as the data store 122A that is located within the service provider network 104. In some examples, the image narrative 108 may include a geographical map indicating the geographic location where the images where taken. For example, the map may show that some images where taken on Sunset Beach, Calif., and other images were taken at a hotel in Palm Springs, Calif. Exemplary GUIs that illustrates the display of an image narrative 108 is shown in FIGS. 2A-2k.

For more details on generating tags and analyzing images, see applications, including U.S. patent application Ser. No. 14/074,575, entitled "SYSTEM AND METHOD FOR AUTOMATICALLY GENERATING ALBUMS" filed Nov. 7, 2013, U.S. patent application Ser. No. 14/074,594, entitled "SYSTEM, METHOD AND APPARATUS FOR SCENE RECOGNITION" filed Nov. 7, 2013, U.S. patent application Ser. No. 14/074,615, entitled "SYSTEM, METHOD AND APPARATUS FOR FACIAL RECOGNITION" filed Nov. 7, 2013, U.S. patent application Ser. No. 14/316,905, entitled "SYSTEM, METHOD AND APPARATUS FOR ORGANIZING PHOTOGRAPHS STORED ON A MOBILE COMPUTING DEVICE" filed Jun. 27, 2015, U.S. patent application Ser. No. 14/747,232, entitled "SYSTEM, METHOD AND APPARATUS FOR IMAGE SCENE RECOGNITION" filed Jun. 23, 2015, each of which is hereby incorporated by reference in its entirety, entitled "SYSTEM, METHOD AND APPARATUS FOR PERFORMING FACIAL RECOGNITION" filed Jun. 24, 2015, PCT Number PCT/US15/36637, entitled "SYSTEM, METHOD AND APPARATUS FOR ORGANIZING PHOTOGRAPHS STORED ON A MOBILE COMPUTING DEVICE" filed Jun. 19, 2015, U.S. Patent Application No. 61/724,628, entitled "SYSTEM, METHOD AND APPARATUS FOR SCENE RECOGNITION," filed Nov. 9, 2012, U.S. Patent Application No. 61/837,210, entitled "SYSTEM, METHOD AND APPARATUS FOR FACIAL RECOGNITION," filed Jun. 20, 2013, U.S. Patent Application No. 61/724,628, entitled "SYSTEM, METHOD AND APPARATUS FOR SCENE RECOGNITION," filed Nov. 9, 2012, U.S. Patent Application No. 61/837,210, entitled "SYSTEM, METHOD AND APPARATUS FOR FACIAL RECOGNITION," filed Jun. 20, 2013, each of which is hereby incorporated by reference in its entirety, which are commonly owned by AMAZON TECHNOLOGIES, INC.

Turning now to FIGS. 2A-2K, examples of graphical user interfaces ("GUIs") are illustrated that display data related to image narratives. The GUIs 200 that are presented are for illustrative purposes only, and are not intended to be limiting.

Figure 2A:
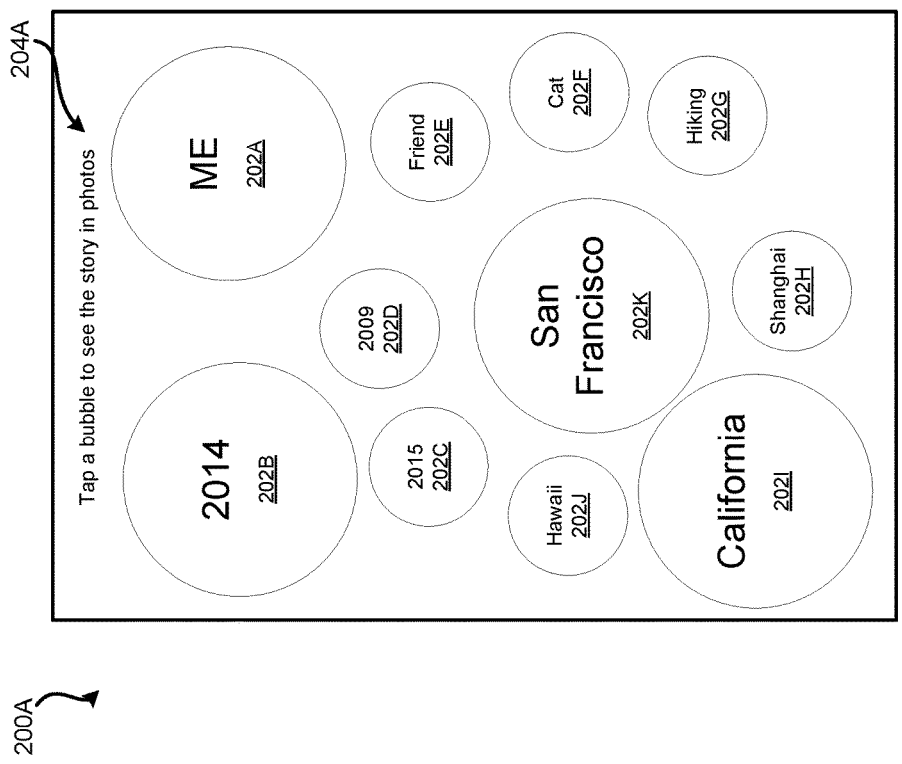

As illustrated, FIG. 2A is a screen diagram showing an illustrative GUI 200A that displays user interface elements that represent image narratives that a user may select to view. The GUI 200A may be generated by the image software product 106, the image service 116, shown in FIG. 1, or some other component or computing device, and presented on a computing device, such as the computing device 102 by an application, such as a Web browser, or the image software product 106.

As illustrated, the GUI 200A includes user interface elements 202A-202K that may be selected by a user to view an image narrative 108 about the subject. The GUI 200 also includes a text element 204A that provides instructions to the user to select one of the UI elements in order to view an image narrative 108. In the current example, the GUI 200A includes circular UI elements that represent an image narrative 108 that relate to different tags identified from an analysis of the images 112 of the user.

In the current example, the size of the circle provides an indication to the user as how many images 112 are related to the title shown within the circle UI element. For example, the majority of images of the user (as determined from the circle sizes) were taken in San Francisco, Calif., in 2014, and include the user (the "ME" circle UI element). The other tags that were popular (e.g., as determined by a frequency of occurrence), where images 112 were taken in 2009 and 2105, images that were taken in Hawaii, images 112 that include a friend (e.g., a best friend), images 112 that include a cat, images that depict an activity ("Hiking"), and images 112 that were taken in Shanghai.

According to some configurations, when a user selects one of the UI elements 202A-202K, an image narrative is accessed and presented to the user. For purposes of illustration, assume that the user selects the friend UI element 202E. In response to selection of the UI element 202E, the GUI 200B is presented to the user.

Figure 2B:
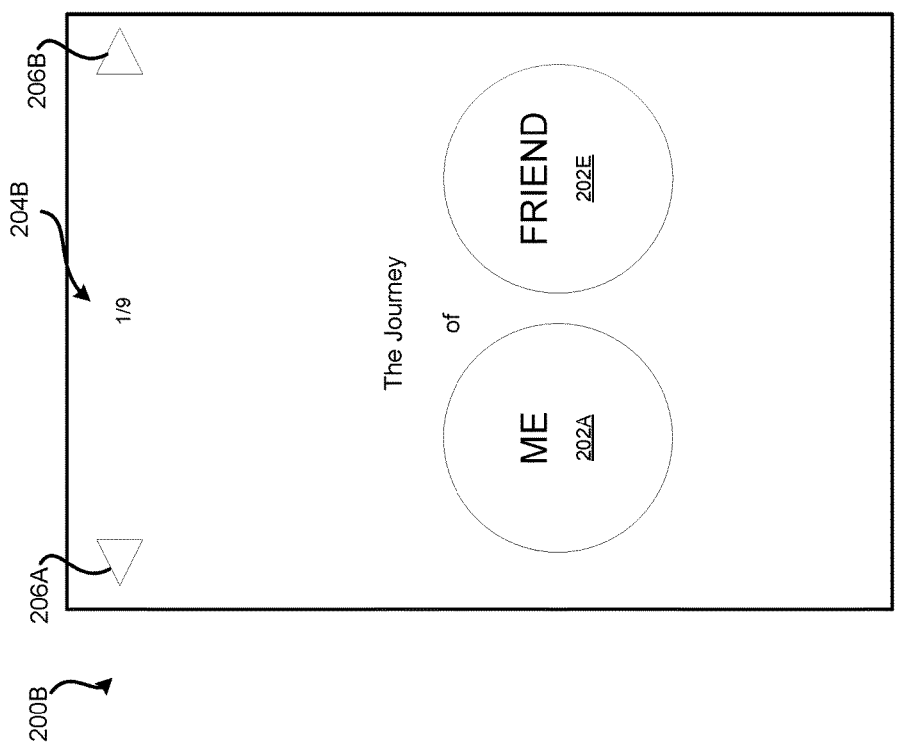

FIG. 2B is a screen diagram showing an illustrative GUI 200B that displays an initial title screen representing an image narrative for the user and the friend. The GUI 200B may be generated by the image software product 106, the image service 116, shown in FIG. 1, or some other component or computing device, and presented on a computing device, such as the computing device 102 by an application, such as a Web browser, or the image software product 106.

As illustrated, the GUI 200B includes navigation UI elements 206A-206B that may be used to navigate between the different displays of the image narrative 108. The GUI 200B also includes a text element 204B that provides the current page number and total pages of an image narrative 108. In the current example, the GUI 200B provides the user with the title, "The Journey of Me and Friend", of the image narrative 108.

According to some configurations, when the user selects the navigation UI element 206B, the next screen of the image narrative 108 is accessed and presented to the user. In response to selection of the navigation UI element 206B, the GUI 200C is presented to the user.

Figure 2C:
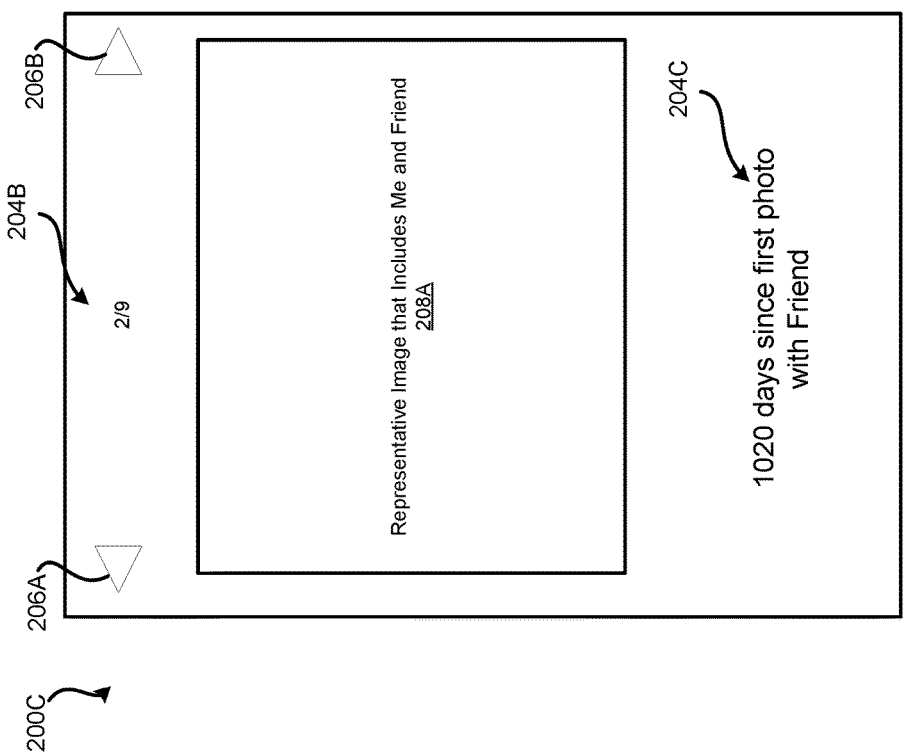

FIG. 2C is a screen diagram showing an illustrative GUI 200C that displays a first image that is representative of the image narrative 108. The GUI 200C may be generated by the image software product 106, the image service 116, shown in FIG. 1, or some other component or computing device, and presented on a computing device, such as the computing device 102 by an application, such as a Web browser, or the image software product 106.

As illustrated, the GUI 200C includes navigation UI elements 206A-206B that may be used to navigate between the different displays of the image narrative 108. The GUI 200C also includes a text element 204B that provides the current page number and total pages of the image narrative 108. In the current example, the GUI 200C displays a representative image 208A that includes the user and the friend. The representative image 208A may be selected by the image manager 130, the image service 116, or the image analysis service 120.

In some examples, an image 112 that includes a prominent display (e.g., the focal points of the image) of the user and the friend is selected for display within the GUI 200C by the image manager 130. The GUI 200C also includes text element 204C that provides the user with information related to the image narrative 108. In the current example, the information provides the user with the number of days "1020" since the first photo with the friend was taken (based on the analyzed images 112).

According to some configurations, when the user selects the navigation UI element 206B, the next screen of the image narrative 108 is accessed and presented to the user. In response to selection of the navigation UI element 206B, the GUI 200D is presented to the user.

Figure 2D:
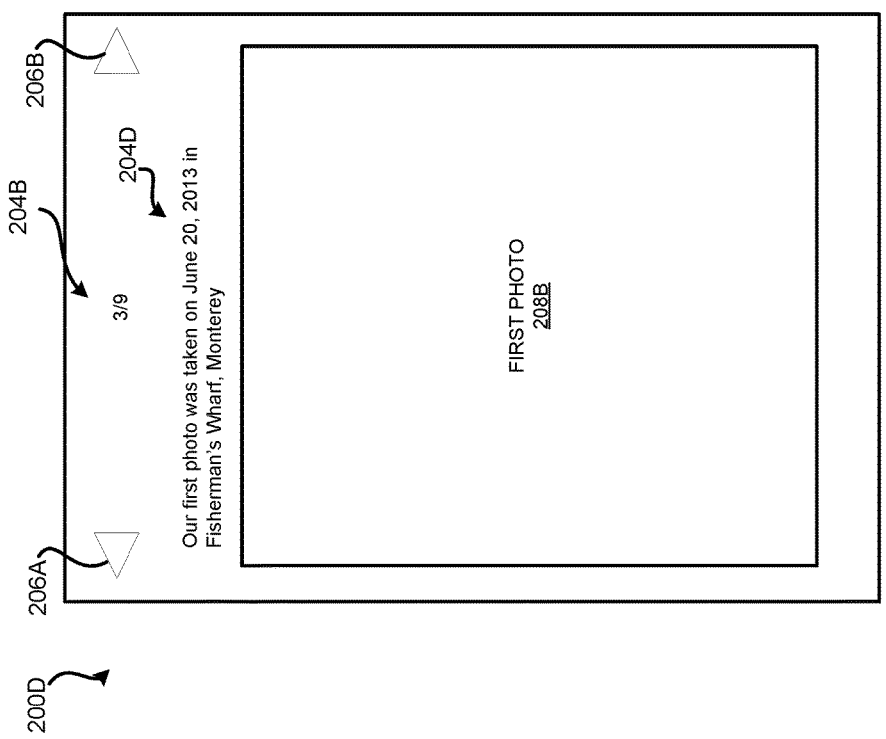

FIG. 2D is a screen diagram showing an illustrative GUI 200D that displays a first image that is representative of the image narrative 108. The GUI 200D may be generated by the image software product 106, the image service 116, shown in FIG. 1, or some other component or computing device, and presented on a computing device, such as the computing device 102 by an application, such as a Web browser, or the image software product 106.

As illustrated, the GUI 200D includes navigation UI elements 206A-206B that may be used to navigate between the different displays of the image narrative 108. The GUI 200D also includes a text element 204B that provides the current page number and total pages of the image narrative 108.

In the current example, the GUI 200D displays the first photo 208B. The first photo 208B may be determined to be the first image 112 taken that is associated with the image narrative 108 and that includes the user and the friend by the image manager 130, the image service 116, the image analysis service 120. The GUI 200D also includes text element 204D that provides the user with information related to first photo 208B. In the current example, the information informs the user that the first photo was taken on Jun. 20, 2013 in Fisherman's Wharf in Monterey.

According to some configurations, when the user selects the navigation UI element 206B, the next screen of the image narrative 108 is accessed and presented to the user. In response to selection of the navigation UI element 206B, the GUI 200E may be presented to the user.

FIG. 2E is a screen diagram showing an illustrative GUI 200E that displays the locations that the user and the friend visited. The GUI 200E may be generated by the image software product 106, the image service 116, shown in FIG. 1, or some other component or computing device, and presented on a computing device, such as the computing device 102 by an application, such as a Web browser, or the image software product 106.

As illustrated, the GUI 200E includes a map 210 that indicates the different locations that the user and the friend that are the subjects of the image narrative 108 have been. The GUI 200E also includes a text element 204B that provides the current page number and total pages of the image narrative 108. In the current example, the GUI 200E displays the map 210 that displays stars on the map indicating where the user and the friend have been on the journey depicted by the image narrative 108. The GUI 200E also shows a representative image from each of the locations as illustrated by image elements 208C-208E. The map 210 and images from the different locations may be provided the image manager 130, the image service 116, the image analysis service 120, or some other component or device. The GUI 200E also includes a selectable link "View Related Photos" 212A that allows the user to view more images related to one or more locations. In the current example, the user has selected element 212A which causes GUI 200F to be presented to the user.

FIG. 2F is a screen diagram showing an illustrative GUI 200F that displays images taken at a selected location. The GUI 200F may be generated by the image software product 106, the image service 116, shown in FIG. 1, or some other component or computing device, and presented on a computing device, such as the computing device 102 by an application, such as a Web browser, or the image software product 106.

As illustrated, the GUI 200F shows image elements 208F-208I that were taken at the selected location. In the current example, the images that are presented were taken at location 1. According to some configurations, when the user selects the navigation UI element 206B, the next screen of the image narrative 108 is accessed and presented to the user. In response to selection of the navigation UI element 206B, the GUI 200G may be presented to the user.

Figure 2G:
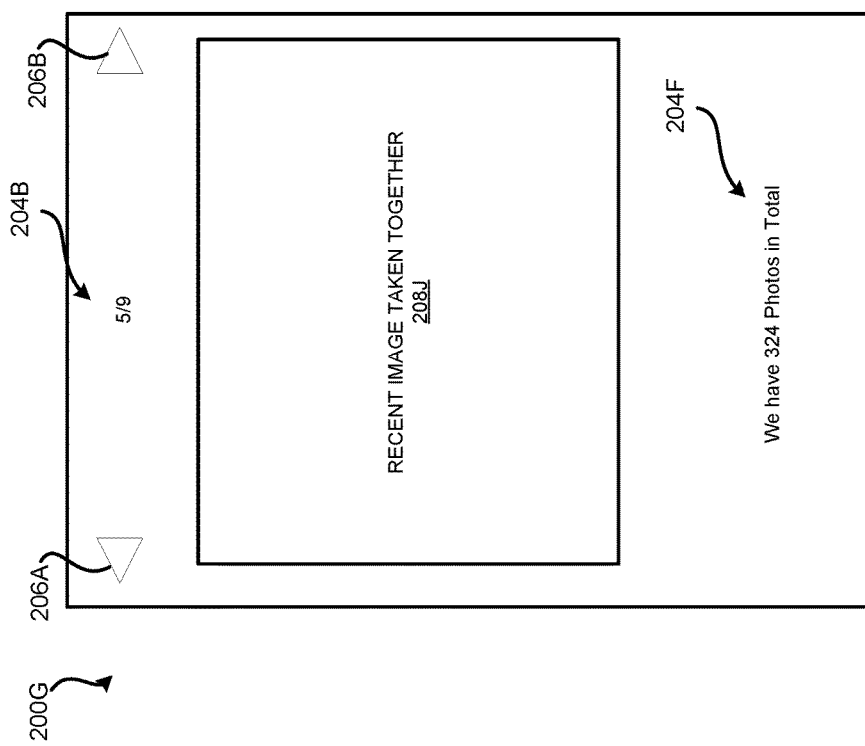

FIG. 2G is a screen diagram showing an illustrative GUI 200G that displays a recent image that includes the user and the friend. The GUI 200G may be generated by the image software product 106, the image service 116, shown in FIG. 1, or some other component or computing device, and presented on a computing device, such as the computing device 102 by an application, such as a Web browser, or the image software product 106.

As illustrated, the GUI 200G shows a recent image in image element 208J that includes the user and the friend. The GUI 200G includes navigation UI elements 206A-206B that may be used to navigate between the different displays of the image narrative 108. The GUI 200G also includes a text element 204B that provides the current page number and total pages of the image narrative 108.

In the current example, the GUI 200G also includes a text element 204F that provides information about the number of photos that include both the user and the friend. As illustrated, the text element 204F shows that 324 images include both the user and the friend.

According to some configurations, when the user selects the navigation UI element 206B, the next screen of the image narrative 108 is accessed and presented to the user. In response to selection of the navigation UI element 206B, the GUI 200H may be presented to the user.

FIG. 2H is a screen diagram showing an illustrative GUI 200H that displays images from a time of the image narrative 108. The GUI 200H may be generated by the image software product 106, the image service 116, shown in FIG. 1, or some other component or computing device, and presented on a computing device, such as the computing device 102 by an application, such as a Web browser, or the image software product 106.

As illustrated, the GUI 200H includes navigation UI elements 206A-206B that may be used to navigate between the different displays of the image narrative 108. The GUI 200H also includes a text element 204B that provides the current page number and total pages of the image narrative 108. In the current example, the GUI 200H displays a subset of the images taken during 2013 as indicated by text element 204G. As shown, the GUI 200H shows image elements 208K-208O. The GUI 200H also includes a selectable text element 212A that allows the user to view more images from the same time period.

According to some configurations, when the user selects the navigation UI element 206B, the next screen of the image narrative 108 is accessed and presented to the user. In response to selection of the navigation UI element 206B, the GUI 200I may be presented to the user.

FIG. 2I is a screen diagram showing an illustrative GUI 200I that displays images from a time of the image narrative 108. The GUI 200I may be generated by the image software product 106, the image service 116, shown in FIG. 1, or some other component or computing device, and presented on a computing device, such as the computing device 102 by an application, such as a Web browser, or the image software product 106.

As illustrated, the GUI 200I includes navigation UI elements 206A-206B that may be used to navigate between the different displays of the image narrative 108. The GUI 200I also includes a text element 204B that provides the current page number and total pages of the image narrative 108. In the current example, the GUI 200I displays a subset of the images taken during 2014 as indicated by text element 204G. As shown, the GUI 200I shows image elements 208K-208O. The GUI 200H also includes a selectable text element 212A that allows the user to view more images from the same time period.

According to some configurations, when the user selects the navigation UI element 206B, the next screen of the image narrative 108 is accessed and presented to the user. In response to selection of the navigation UI element 206B, the GUI 200J may be presented to the user.

Figure 2J:
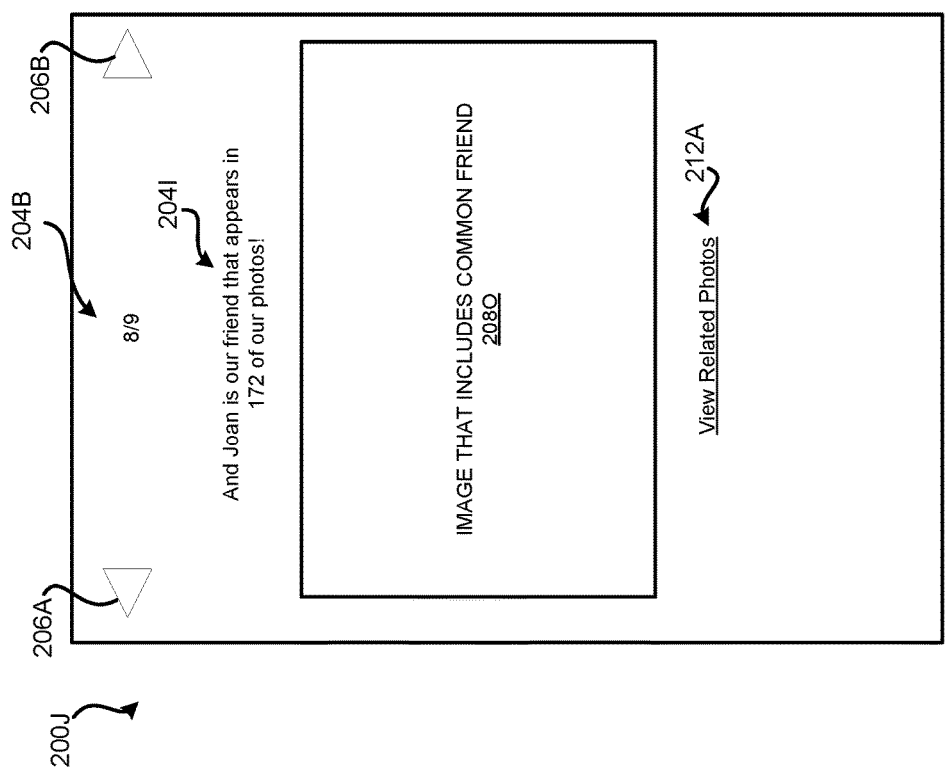

FIG. 2J is a screen diagram showing an illustrative GUI 200J that displays a representative image that includes a friend that is commonly included in images that also contain the user and the friend. The GUI 200J may be generated by the image software product 106, the image service 116, shown in FIG. 1, or some other component or computing device, and presented on a computing device, such as the computing device 102 by an application, such as a Web browser, or the image software product 106.

As illustrated, the GUI 200J shows a recent image in image element 208J that includes the user and the friend. The GUI 200G includes navigation UI elements 206A-206B that may be used to navigate between the different displays of the image narrative 108. The GUI 200J also includes a text element 204B that provides the current page number and total pages of the image narrative 108.

In the current example, the GUI 200J shows an image element 208O that includes the user, the friend, and the other friend and also includes a text element 204I that provides information about another friend "Joan" that appears in 172 of the photos that include both the user and the friend. To view more images 112 that include the user, the friend, and "Joan", the user may select the selectable text element 212A.

According to some configurations, when the user selects the navigation UI element 206B, the next screen of the image narrative 108 is accessed and presented to the user. In response to selection of the navigation UI element 206B, the GUI 200K may be presented to the user.

Figure 2K:
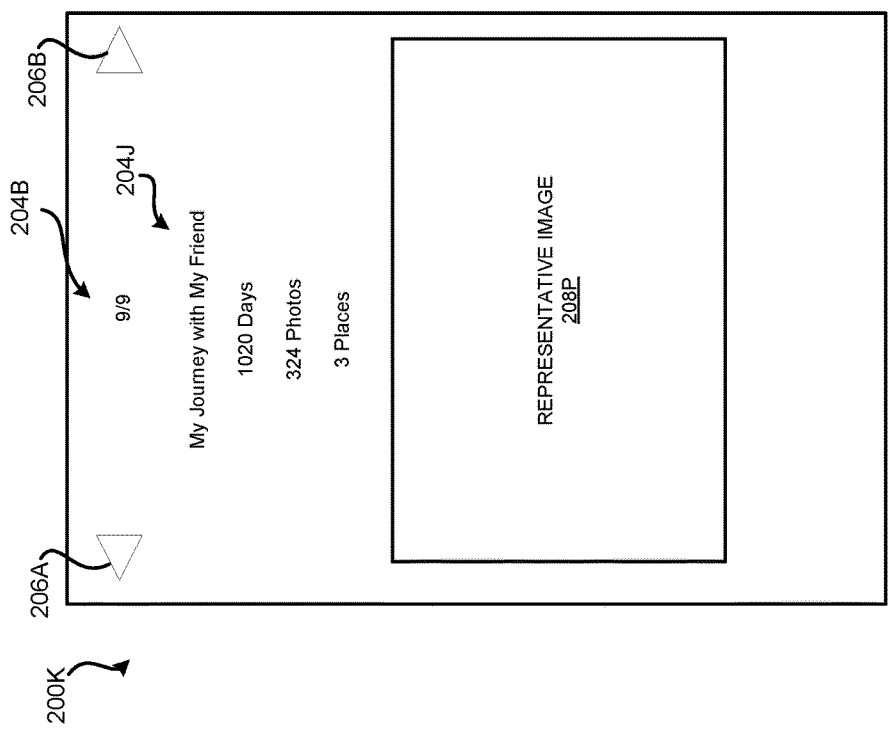

FIG. 2K is a screen diagram showing an illustrative GUI 200K that displays a last page of the image narrative for the user and the friend. The GUI 200K may be generated by the image software product 106, the image service 116, shown in FIG. 1, or some other component or computing device, and presented on a computing device, such as the computing device 102 by an application, such as a Web browser, or the image software product 106.

As illustrated, the GUI 200K shows a representative image in image element 208P that includes the user and the friend. In some examples, the image may be the last image taken that includes the user and the friend. The GUI 200K includes navigation UI elements 206A-206B that may be used to navigate between the different displays of the image narrative 108. The GUI 200K also includes a text element 204B that provides the current page number and total pages of the image narrative 108.

In the current example, the GUI 200K includes a text element 204J that provides a brief summary of the images associated with the image narrative 108. In the current example, the text element 204J provides the number of days ("1020") represented in the image narrative 108, the number of photos ("324") included in the image narrative 108, and the number of locations ("3") visited by the user and the friend. While one example image narrative has been illustrated, other image narratives that include more or less information and images may be created.

FIGS. 3-6 are flow diagrams showing routines that illustrate aspects of creating image narratives for a user. It should be appreciated that the logical operations described herein with respect to FIGS. 3, 4, 5 and 6, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

Figure 3:
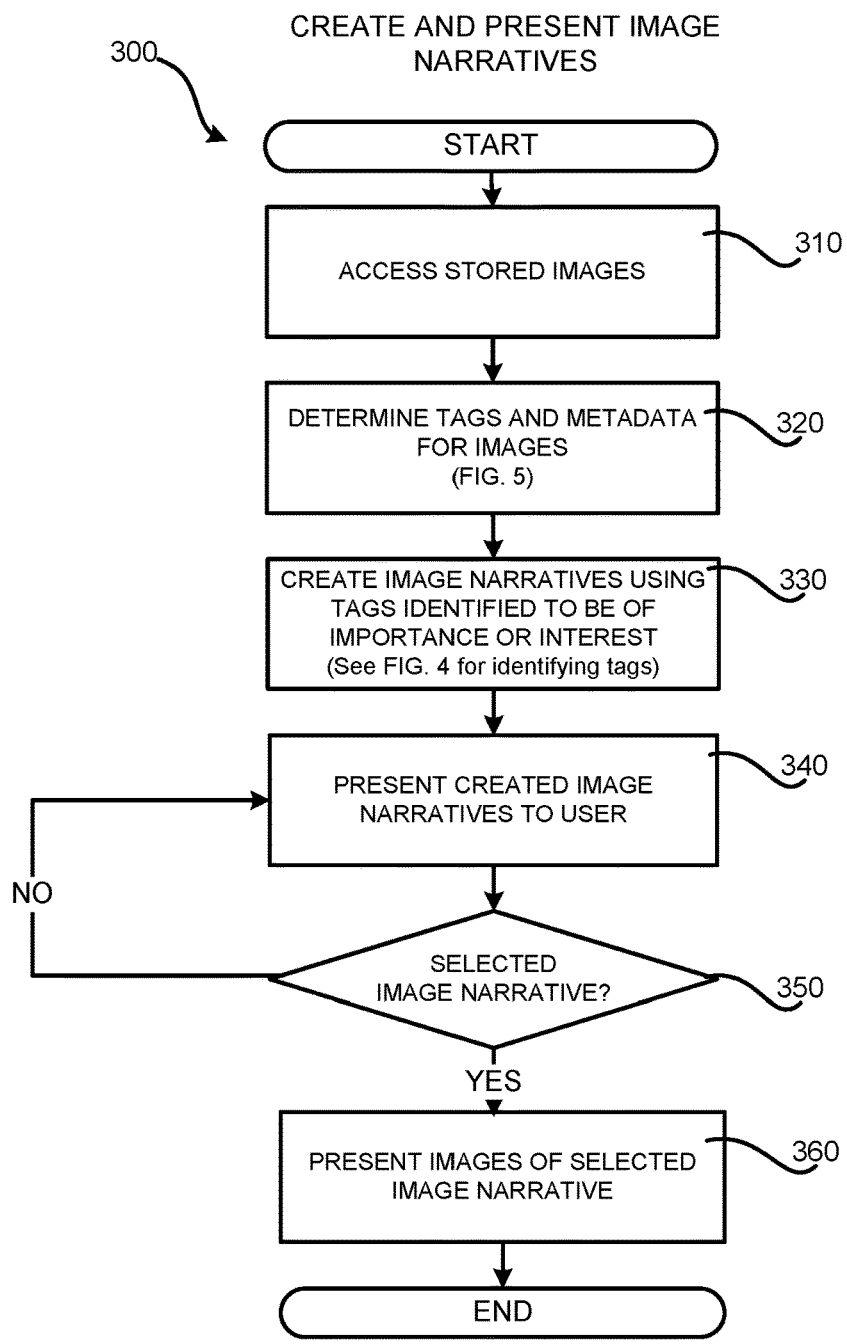
FIG. 3 is a flow diagram showing a routine illustrating aspects of a mechanism disclosed herein for creating and presenting image narratives.

FIG. 3 is a flow diagram showing a routine 300 illustrating aspects of a mechanism disclosed herein for creating and presenting image narratives 108. The routine may begin at 310, where stored images 112 associated with a user may be accessed. As discussed above, the stored images 112, such as within the data store 122A-122B, or some other image source 124, may be accessed by the image service 116, the image analysis service 120, the image software product 106, or some other component or device. In some examples, the images that are accessed may be specified by the user. For example, the user may provide an indication to select all or a portion of the images. As also discussed above, the images 112 of a user might also be accessed from a social media site (e.g., Facebook, Twitter) or some other image source 124.

At 320, the tags and the metadata 118A associated with the images 112 of the under may be determined. As discussed above, the tags and metadata 118A may already be determined for all or a portion of the images 112. In some examples, the image analysis service 120 generates the tags for at least a portion of the images 112 and provides the tags and the metadata 118A to the image service 116 and/or the image analysis service 120. In other examples, the image manager 130 may access the tags and the metadata 118A from the data store 122A or the data store 122B. More details regarding determining the tags and metadata 118A are provided below in FIG. 5.

At 330, the image narratives 108 for a user are created. As discussed above, the image narratives 108 are created by analyzing the tags and metadata 118A of the image and determining the items of interest to the user. In some configurations, the tags that are determined to be of interest to the user are used to create the image narratives 108. In other examples, the tags used to generate an image narrative may be received from a user. More details about identifying the tags or importance to the user are provided in FIG. 4.

At 340, the images narratives 108 are presented to the user. As discussed above, the image service 116 or the image software product 106 may generate a GUI that includes selectable UI elements that represent the image narratives 108. FIG. 2A provides an example GUI 200A that includes UI elements 202A-202K that represent created image narratives 108.

At 350, a determination is made as to whether a user has selected one of the image narratives 108 for viewing. When a user has selected an image narrative 108, the routine 300 proceeds to 360. When a user has not selected an image narrative 108, the routine 300 returns to operation 340.

At 360, the images of the selected image narrative are presented to the user. As discussed above, the image narrative 108 may be presented on a computing device 102 or on some other display. In some examples, the image narrative 108 includes information and images 112 spread out over multiple pages and displays of a GUI. The routine 300 may then proceed to an end operation. Alternately, the routine 300 might proceed back to repeat some or all of the processing operations described above. For example, from 350, routine 300 may proceed back to 310.

Figure 4:
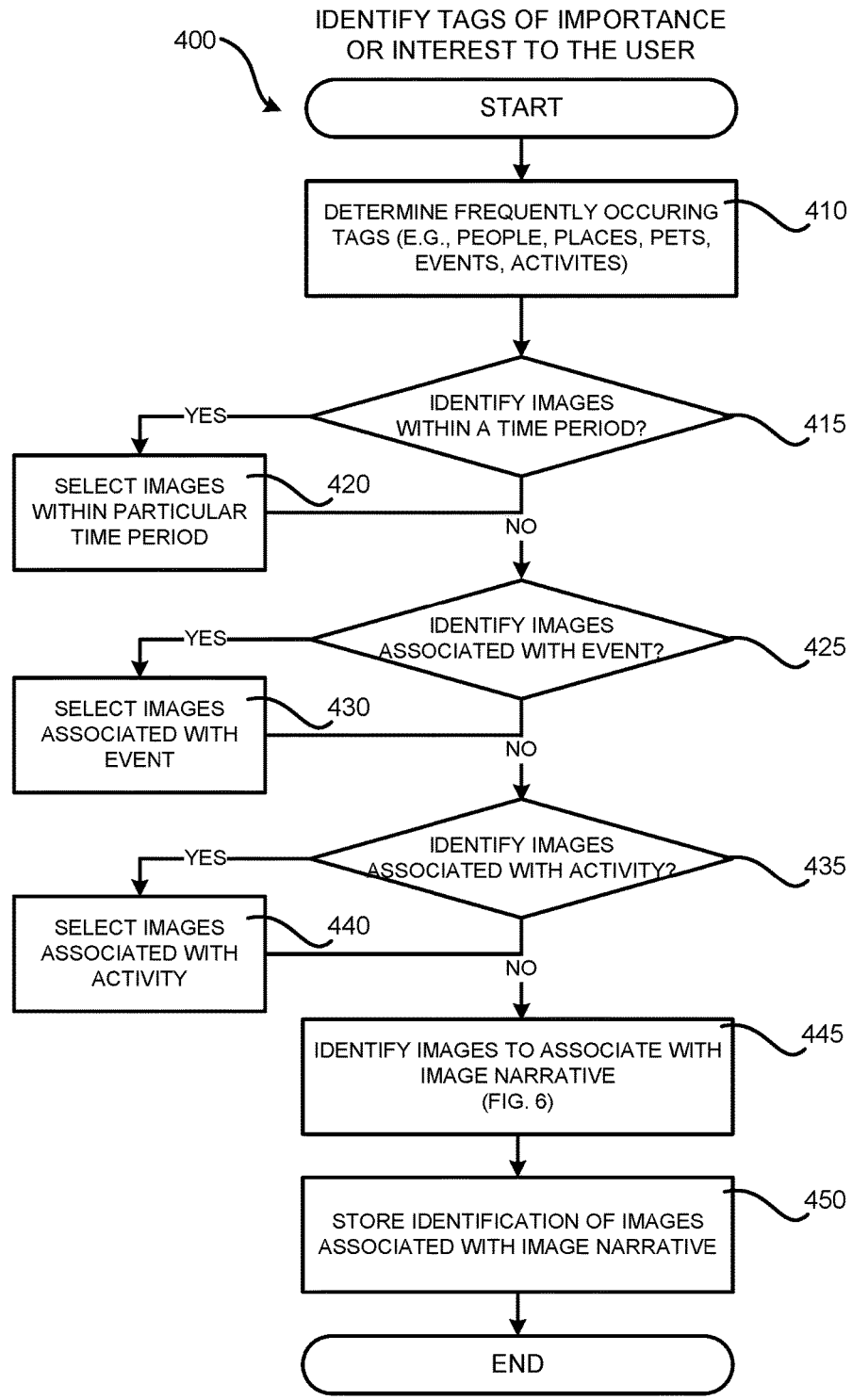
FIG. 4 is a flow diagram showing a routine illustrating aspects of a mechanism disclosed herein for identifying tags of importance or that are interesting to a user.

FIG. 4 is a flow diagram showing a routine 400 illustrating aspects of a mechanism disclosed herein for identifying tags of importance or that are interesting to the user. The routine 400 may begin at 410, where frequently occurring tags are determined. As discussed above, tags that are frequently occurring within the images 112 may provide an indication that the user is interested in these particular items. For example, frequently occurring tags may indicate individuals that are important to the user, places that the user likes to visit, pets of the user, events that the user has attended, and activities that the user participates in. In other examples, the user may provide the tags that are of interest to the user. As discussed, these tags provided by the user may be used by the image manager 130 to generate an image narrative.

At 415, a decision is made as to whether to identify images within a time period. As discussed above, an image narrative may be associated with a particular time period (e.g., the last month, six months, two years, or a time period associated with a particular event or activity. In some configurations, a user may specify a time period. In other examples, the image manager 130, or some other computing device or component, may identify a time period. When images are to be associated with a particular time period, the routine 400 moves to 420. When images are not to be associated with a particular time period, the routine 400 moves to 425.

At 420, images within a particular time period are selected. As discussed above, the image manager 130 may identify the images that are associated with a particular time period using the tags associated with the images 112.

At 425, a decision is made as to whether to identify images associated with an event. As discussed above, an image narrative may be associated with a particular event. In some configurations, a user may specify an event, or events, in which they are interested. For example, a user may supply a tag for an event. In other examples, the user may perform a search for an event. In other examples, the image manager 130, or some other computing device or component, may identify events of interest to the user. When images are to be associated with a particular event, the routine 400 moves to 430. When images are not to be associated with a particular event, the routine 400 moves to 435.

At 430, images associated with an event are selected. As discussed above, the image manager 130 may identify the images that are associated with a particular event using the tags associated with the images 112.

At 435, a decision is made as to whether to identify images associated with an activity. As discussed above, an image narrative may be associated with a particular activity. In some configurations, a user may specify an activity, or activities, in which they are interested. For example, a user may supply a tag for an activity. In other examples, the user may perform a search for an activity. In other examples, the image manager 130, or some other computing device or component, may identify activities of interest to the user. When images are to be associated with a particular event, the routine 400 moves to 440. When images are not to be associated with a particular activity, the routine 400 moves to 445.

As can be seen from the above discussion, the image manager 130 may identify an association between tags of images based on various criteria. For example, the image service 116 may identify that a particular individual is frequently shown in the images 112 and that within those images a particular activity is occurring. In some configurations, the image manager 130 determines for tags that are frequently occurring (e.g., the top predetermined number of tags) and determines other tags that occur within the same image. According to some examples, the tags that occur in common with the frequently occurring tags may be associated with another tag if that tag is also frequently occurring within the same images 112 within some specified time.

At 445, the images 112 to associate with an image narrative being created are identified. As discussed above, the image manager 130 identifies the images to associate with the image narrative 108 based on the image narrative being created and the tags being utilized. For example, for the image narrative 108 illustrated in FIG. 3, the images to associate with the image narrative 108 include images that include both the user and the identified friend. More details are provided below with regard to FIG. 6.

At 450, the identification of the images 112 associated with the image narrative 108 are stored. As discussed above, the images 112 that are associated with the image narrative 108 may be stored within the data store, such as data store 106 or data store 112B. In some examples, the identification of the images is stored within a file that includes a reference to the location of the images that are associated with the image narrative 108. The routine 400 may then proceed to an end operation. Alternately, the routine 400 might proceed back to repeat some or all of the processing operations described above. For example, from 450, routine 400 may proceed back to 410.

Figure 5:
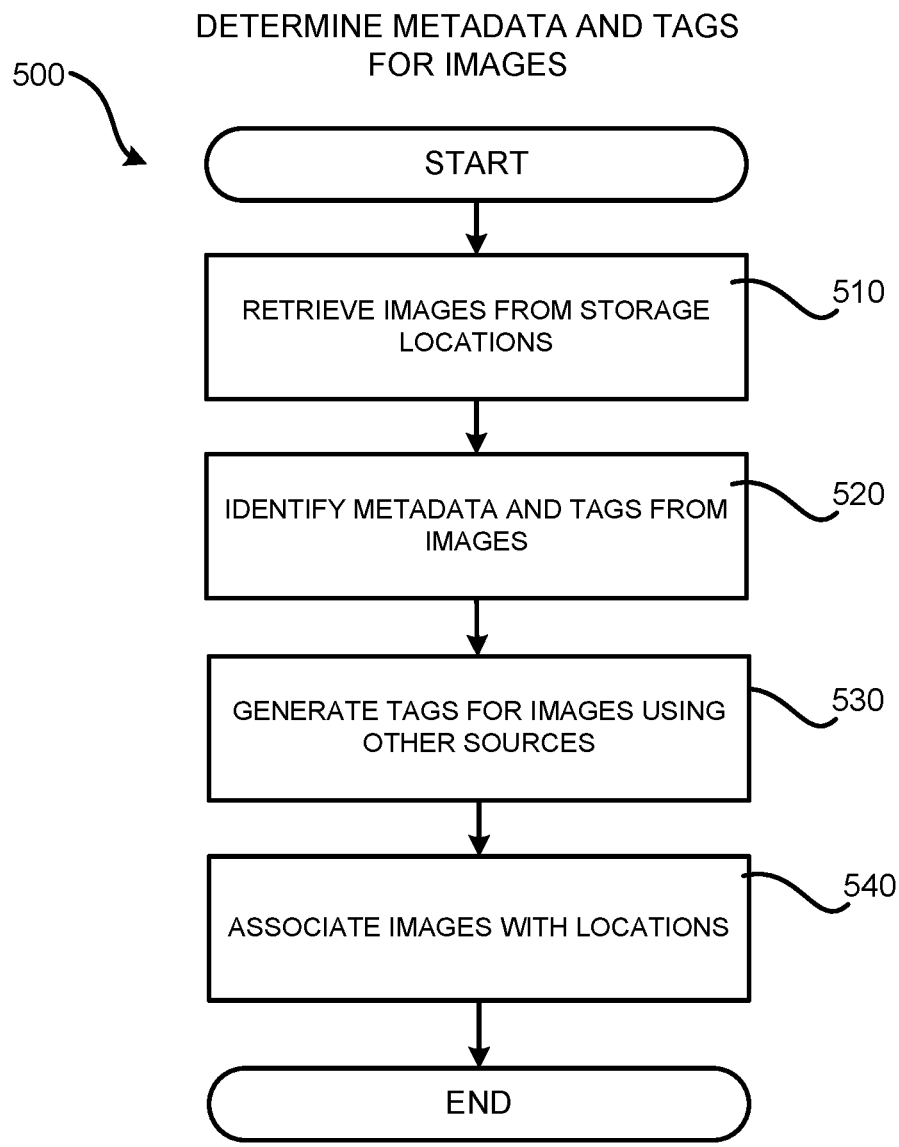
FIG. 5 is a flow diagram showing a routine illustrating aspects of a mechanism disclosed herein for determining tags and metadata for images.

FIG. 5 is a flow diagram showing a routine 500 illustrating aspects of a mechanism disclosed herein for determining tags and metadata 118A for images 112. The routine 500 may begin at 510, where images are retrieved from storage locations. As discussed above, the images might be obtained from a variety of different locations. For example, the images may be obtained from a service provider network 104, a computing device, such as a computing device 102, or from some other image source, such as a social networking site or some other data store.

At 520, tags and metadata 118A identified from the images. As discussed above, tags and metadata 118A may be included with the images and/or determine from the images. For example, the image analysis service 120 may determine the tags for the image and store the tag information with the images. In some configurations, the image service 116 or the image analysis service may normalize the tags of the images 112. For example, "dusk" tags and "twilight" tags within the images 112 may be changed to "sunset." As an additional example, tags may be generated based on results of scene understanding and/or facial recognition that are performed on each image.

At 530, tags may be generated for the images 112 using additional sources. For example, while some images 112 may have tags already applied, the image analysis service 120, may further analyze the image to determine additional tags. For example, the image analysis service 120 may generate a location tag using location metadata associated with the image. For instance, GPS coordinates may be used to create the location tag (e.g., "Santa Monica Beach, California" or "O'Hare Airport, Chicago").

As another example, event tags might be generated by the image analysis service 120 using the metadata. For instance, the date when the image was taken may be used to determine that the image was taken on a holiday, on a birthday of a recognized individual, on a graduation data, or the like. In some example, a correlation between a date associated with an image 112 and an event, an external data source may be accessed. For instance, a social networking site for one or more users may be accessed to assist in determining whether the date is associated with an event of importance or interest to the user. As another examples, one or more external data sources may be queried (e.g., WIKIPEDIA, GOOGLE, BING, and the like) to assist in determining whether the date is associated with an event of importance or interest to the user.

As yet another example, the image creation time for an image may be used by the image service 116 or the image analysis service 120 to assist in generating tags for an image. For example, when the scene type is determined to be beach and the creation time is near the time of the sunset for the location, a tag may be a dusk scene or a sunset scene.

At 540, the images may be associated with the location. As discussed above, an image may include a location of where the image was taken. This information may be used by the end image analysis service 120, or the image service 116 to identify location of where the image 112 was taken. The location information may be used to associate the image with a particular location on a map. The routine 500 may then proceed to an end operation. Alternately, the routine 500 might proceed back to repeat some or all of the processing operations described above. For example, from 540, routine 500 may proceed back to 510.

Figure 6:
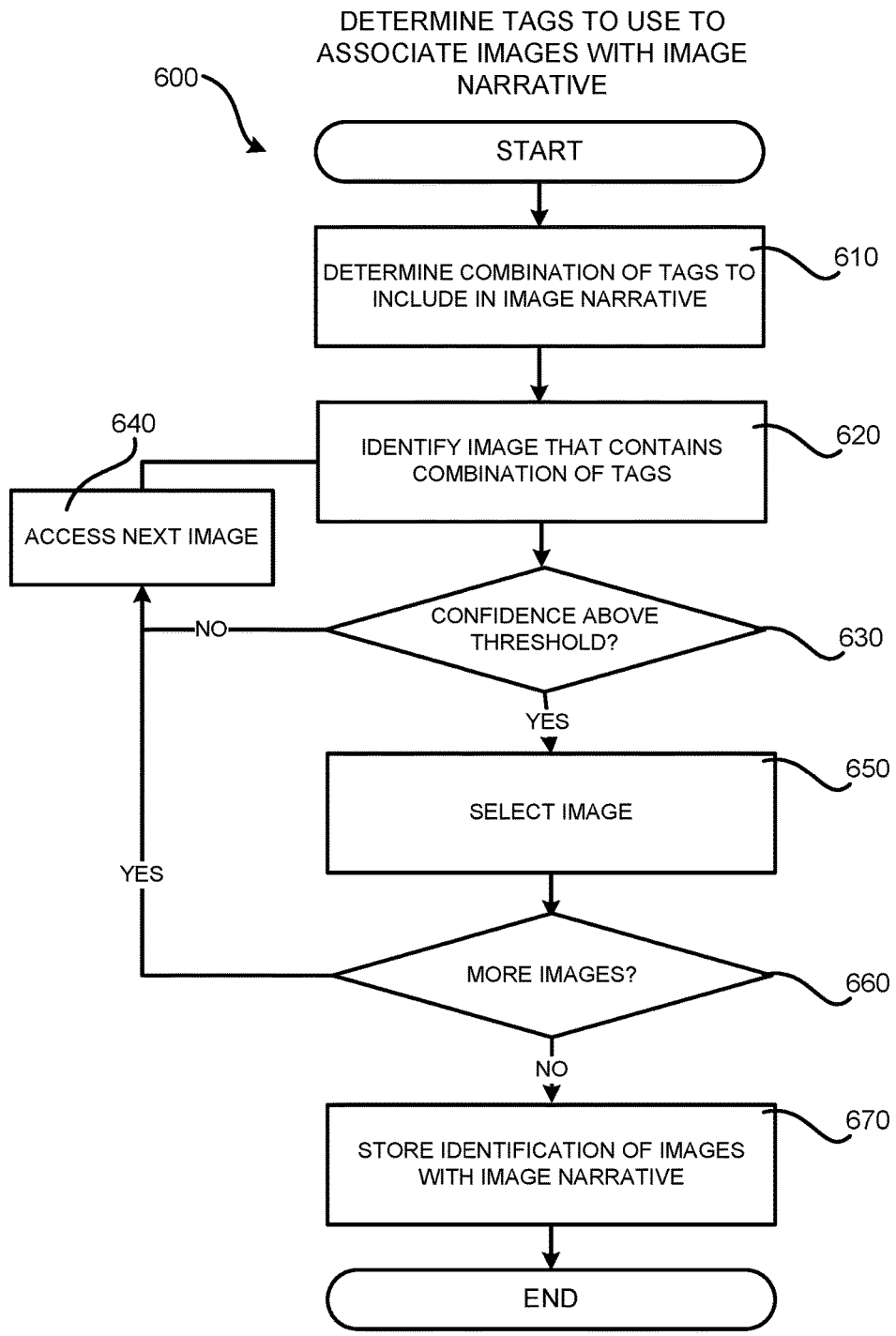
FIG. 6 is a flow diagram showing a routine illustrating aspects of a mechanism disclosed herein for determining a combination of tags to include in an image narrative.

FIG. 6 is a flow diagram showing a routine 600 illustrating aspects of a mechanism disclosed herein for determining a combination of tags to include in an image narrative. The routine 600 may begin at 610, where a combination of tags to include in an image narrative 108 is determined. As discussed above, some image narratives 108 may be associated with more than a single tag. For example, the image narrative 108 illustrated in FIG. 2 includes the user's tag as well as a friend's tag. The image narrative 108 may also be associated with a particular time, event, activity, or some other combination.

At 620, the images that contain the combination of tags are identified. As discussed above, the images 112 that contain the tags of interest may be associated with the image narrative being created. In some examples, all of the images 112 that contain the combination of tags are identified and a reference to the images 112 are stored by the image manager 130 within the data store 122A or the data store 122B. In other examples, the images that contain the combination of tags that exceed a specified confidence level are selected for the image narrative. As discussed above, the confidence level associated with a tag can indicate how likely that tag is correct.

At 630, a determination is made as to whether the tag or tags of an image that can be associated with a particular image narrative 108 are above a specified threshold. The threshold may be predetermined by a user and/or programmatically determined by the image manager 130 based on how many images 112 can be associated with the image narrative 108. For example, the threshold may be set higher when more images are available and lower when fewer images are available. In some examples, the threshold may be set such that the images 112 selected for the image narrative 108 include the combination of tags having the highest associated confidence. The confidence score can be based on all or a portion of the factors used to determine the image narratives. For example, the confidence score could be a confidence score for one tag that identifies a confidence that the tag is correct, or a confidence score for a combination of tags that identifies a confidence that the combination of tags are correct. For instance, a confidence score that an individual is included within one or more images may be high, but the confidence for the individual is attending a particular event or is at a particular location may be low. Therefore, the image might be determined to be part of an image narrative that includes the individual as a "friend", but may not be determined to be part of an image narrative that includes the particular event or particular location. In some examples, the confidence score may be used during operation 610 to identify the tags that frequently occur in combination which can change the presented image narratives and what images are associated with the image narratives. When the confidence is above the threshold, the routine 600 moves to 650 where the image is selected. When the confidence is not above the threshold, the routine 600 moves to 640 where a next image 112 is accessed from the images that may be associated with the image narrative.

At 660, a determination is made as to whether there are more images that can be associated with a particular image narrative 108. When there are more images, the routine 600 moves to 640 where the next image is accessed. When there are not more images, the routine 600 moves to 670.

At 670, the identification of the images 112 are associated with the image narrative 108 being created are stored within a data store. As discussed above, the image manager 130 or some other component or device may create references to the images 112 that are associated with an image narrative 108. An image 112 may be associated with more than one image narrative 108. In some configurations, the image manager 130 create a table within a database that includes an identifier for the images 112 that are associated with an image narrative 108 and the other information that might be presented within the image narrative.

Figure 7:
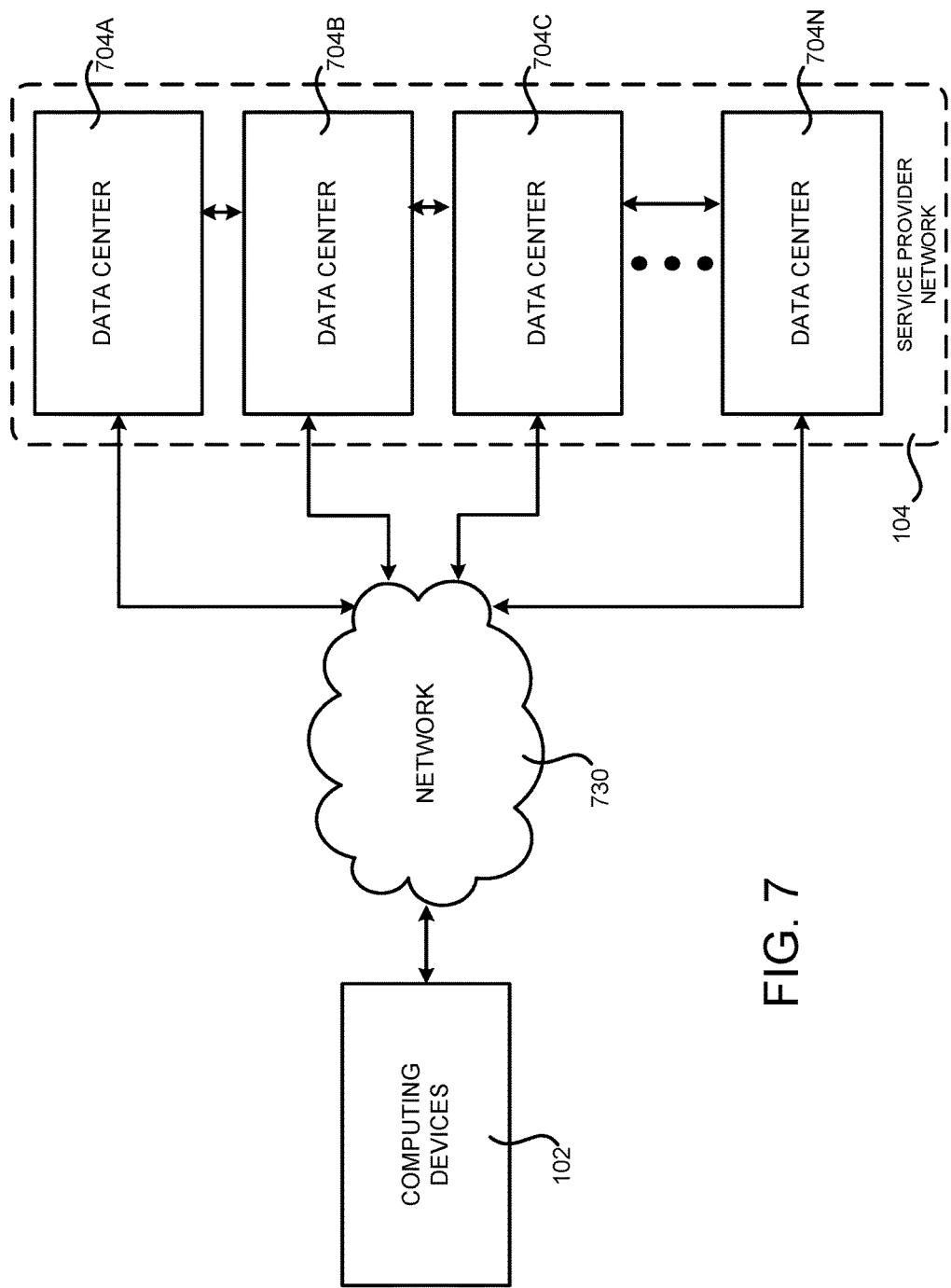
FIG. 7 is a system and network diagram that shows one illustrative operating environment for the examples disclosed herein that includes a service provider network.

FIG. 7 and the following description are intended to provide a brief, general description of a suitable computing environment in which the examples described herein may be implemented. In particular, FIG. 7 is a system and network diagram that shows an illustrative operating environment that includes a service provider network 104. As discussed above, the service provider network 104 can provide virtual machine instances and computing resources on a permanent or an as-needed basis.

The computing resources provided by the service provider network 104 may include various types of resources, such as data processing resources, data storage resources, networking resources, data communication resources and the like. Each type of computing resource may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 104 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. One illustrative configuration for a data center 704 that implements some or all of the concepts and technologies disclosed herein for annotating resources in the service provider network 104 will be described below with regard to FIG. 8.

The users and customers of the service provider network 104 may access the computing resources provided by the data centers 704 over a suitable data communications network, such as a Wide Area Network ("WAN"), as illustrated by network 730. Although a WAN might be used, it should be appreciated that a local-area network ("LAN"), the Internet, or any other networking topology known in the art that connects the data centers 704 to the computing devices 102 may be utilized. It should also be appreciated that combinations of such networks might also be utilized.

Figure 8:
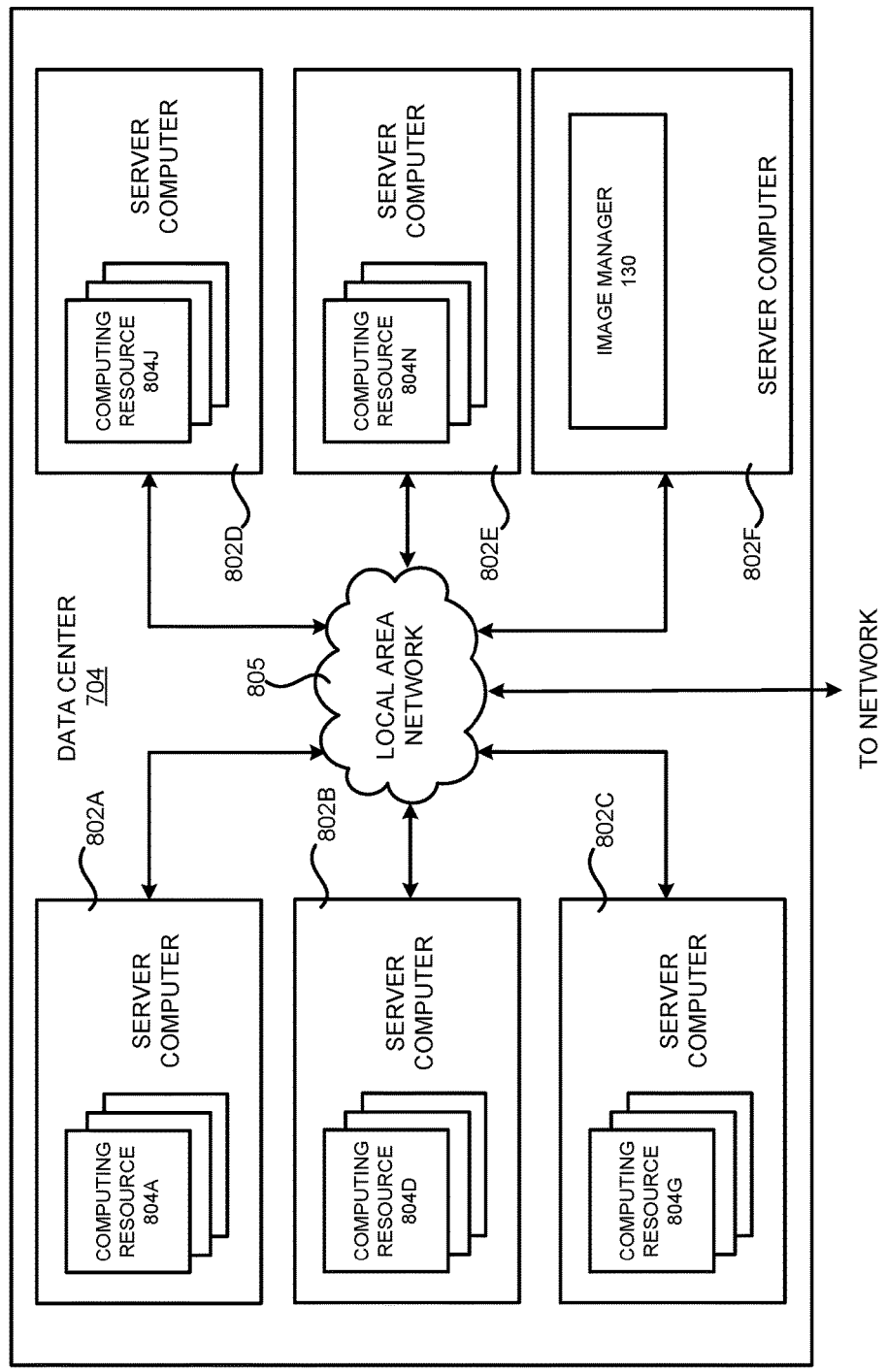
FIG. 8 is a computing system diagram that illustrates one configuration for a data center that implements aspects of a service provider network, including some or all of the concepts and technologies disclosed herein for intelligently selecting images to create image narratives.

FIG. 8 is a computing system diagram that illustrates one configuration for a data center 704 that implements aspects of a service provider network 104, including some or all of the concepts and technologies disclosed herein for intelligently selecting images to create image narratives. The example data center 704 shown in FIG. 8 includes several server computers 802A-802F (which may be referred to herein singularly as "a server computer 802" or in the plural as "the server computers 802") for providing computing resources. The server computers 802 may be standard tower or rack-mount server computers configured appropriately for providing the computing resources described herein. According to an example, the server computers 802 are configured to execute the software products as described above.

In one example, some of the computing resources 804 are virtual machine instances. As known in the art, a virtual machine instance is an instance of a software implementation of a machine (i.e. a computer) that executes programs like a physical machine. Each of the server computers 802 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 802, for example.

It should be appreciated that although the examples disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 704 shown in FIG. 8 also includes a server computer 802F reserved for executing software components for managing the operation of the data center 704, the server computers 802, virtual machine instances, and other resources within the service provider network 104. The server computer 802F might also execute the image manager 130. Details regarding the operation of each of these components has been provided above. In this regard, it should be appreciated that while these components are illustrated as executing within the service provider network 104, computing systems that are external to the service provider network 104 might also be utilized to execute some or all of these components. Other configurations might also be utilized.

In the example data center 704 shown in FIG. 8, an appropriate local area network ("LAN") 805 is utilized to interconnect the server computers 802A-802E and the server computer 802F. The LAN 805 is also connected to the network 730 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 704A-704N, between each of the server computers 802A-802F in each data center 704 and between virtual machine instances and other types of computing resources provided by the service provider network 104.

It should be appreciated that the data center 704 described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 9:
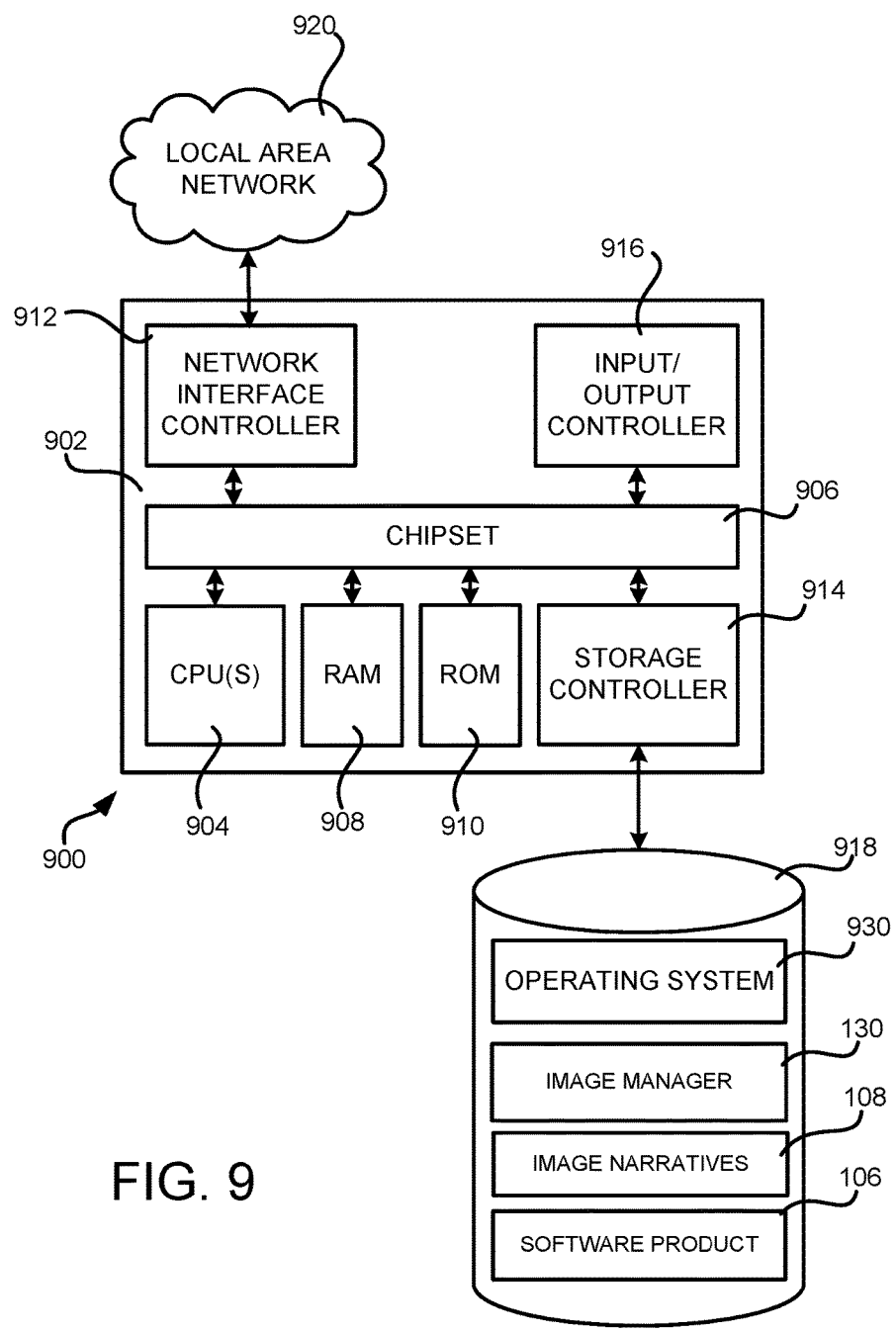
FIG. 9 is a computer architecture diagram showing one illustrative computer hardware architecture for implementing a computing device that might be utilized to implement aspects of the various examples presented herein.

FIG. 9 shows an example computer architecture for a computer 900 capable of executing program components for intelligently selecting images to associate with an image narration in the manner described above. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 9 may be utilized to execute software components for performing operations as described above. The computer architecture shown in FIG. 9 might also be utilized to implement a computing device 102 or any other of the computing systems described herein.

The computer 900 includes a baseboard 902, or "motherboard," which is a printed circuit board to which a multitude of components or devices may be connected by way of a system bus or other electrical communication paths. In one illustrative example, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the examples described herein.

The computer 900 may operate in a networked environment using logical connections to remote computing devices and computer systems through a network, such as the local area network 920. The chipset 906 may include functionality for providing network connectivity through a network interface controller ("NIC") 912, such as a gigabit Ethernet adapter. The NIC 912 is capable of connecting the computer 900 to other computing devices over the local area network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 918 may store other system or application programs and data utilized by the computer 900, such as components that include the image manager 130, the image narratives 108, the software product 106 and/or any of the other software components and data described above. The mass storage device 918 might also store other programs and data not specifically identified herein.

In one example, the mass storage device 918 or other computer-readable storage media is encoded with computer-executable instructions that, when loaded into the computer 900, transform the computer into a special-purpose computer capable of implementing the examples described herein. These computer-executable instructions transform the computer 900 by specifying how the CPUs 904 transition between states, as described above. According to one example, the computer 900 has access to computer-readable storage media storing computer-executable instructions which, when executed by the computer 900, perform the various routines described above with regard to FIGS. 4-6. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for intelligent selection of images to create narratives have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   access images associated with a user;
   identify tags that are associated with the images, wherein individual ones of the tags identify at least one or more objects within the images, one or more individuals within the images, or one or more scenes within the images;
   determine frequencies of the tags, wherein the frequencies include a first frequency of a first tag, a second frequency of a second tag, and a third frequency of a third tag;
   identify a portion of the tags that occur above a threshold based, at least in part, on the frequencies;
   identify candidate images associated with the portion of the tags that occur above the threshold;
   determining whether the candidate images are associated with a particular time period, an event, an individual, or an activity;
   identify, based at least in part on the determining, narrative images for an image narrative from the candidate images;
   select at least a first portion of the narrative images based, at least in part, on a first one of the tags that occur above the threshold;
   associate the at least first portion of the images with an image narrative;
   provide for display, to a client computing device, an indication of the image narrative;
   receive an indication of a selection of the image narrative; and
   provide, to the client computing device, an instruction to display a portion of the narrative images associated with the image narrative.

2. The non-transitory computer-readable storage medium of claim 1, wherein the computer-executable instructions further cause the computer to sort] the tags according to a number of times the tags appear in the images, and selecting the first one of the tags based, at least in part, on the sorting of the tags.

3. The non-transitory computer-readable storage medium of claim 1, wherein select at least the first portion of the images comprises selecting the first portion of the narrative images based, at least in part, on a confidence level associated with the tags.

4. The non-transitory computer-readable storage medium of claim 1, wherein the computer-executable instructions further cause the computer to store, within a data store of the client computing device, an indication of narrative images identified.

5. The non-transitory computer-readable storage medium of claim 1, wherein the computer-executable instructions further cause the computer to identify tags modified by the user, and identify the narrative images, based, at least in part, on the tags modified by the user.

6. A system, comprising:
   a data store operative to store images associated with a first user; and
   one or more computing devices performing operations to:
   access, from the data store, at least a portion of the images associated with a first user;
   obtain tags associated with the images, the tags describing individuals identified, scenes identified, and locations identified;
   determine frequencies of the tags for the images;
   identify, from the tags, first images from the images associated with the first user that depict one or more of: an activity that the user participates in; or an event the user attended;
   select a first portion of the first images based, at least in part, on the frequencies of the tags for the images and a determination that a confidence score of the first portion of the first images is above a confidence threshold, the confidence score indicating a level of confidence that tags within the first portion of the first images are associated;
   associate the first portion of the first images with an image narrative; and provide, to a client computing device, data identifying the first portion of the first images of the image narrative.

7. The system of claim 6, wherein the one or more computing devices perform further operations to:
receive an indication of a selection of a user interface element associated with the image narrative; and
provide, to the client computing device, an instruction to provide a display of the image narrative.

8. The system of claim 6, wherein the one or more computing devices perform further operations to determine a user and a second user depicted within at least a portion of the images.

9. The system of claim 8, wherein select the first portion of the first images, comprises selecting the first portion of the first images based at least in part on a confidence score that a first tag exceeds a first confidence level and a second tag exceeds a second confidence level.

10. The system of claim 6, wherein the one or more computing devices perform further operations to store, within the data store, an indication of the first portion of the first images associated with the image narrative.

11. The system of claim 6, wherein the one or more computing devices perform further operations to identify tags modified by the user, and select the first portion of the first images based, at least in part, on the tags modified by the user.

12. The system of claim 6, wherein the one or more computing devices perform further operations to access, from one or more other image sources, second images associated with the user, identify second tags from image data of the second images, and aggregate the second tags with the first tags.

13. The system of claim 6, wherein the image narrative includes images that relate to one or more of an event at a particular location, an activity over a period of time, or a connection between the first user and a second user over a period of time.

14. The system of claim 13, wherein the images for the image narrative are based at least in part on the period of time.

15. The system of claim 6, wherein the one or more computing devices perform further operations to provide data for display on the client computing device within a graphical user interface that includes a first user interface element for the image narrative and a second user interface element for a second image narrative.

16. A computer-implemented method, comprising:
accessing, from one or more data stores, images associated with a first user;
obtaining tags associated with the images, the tags identifying faces within the images, scenes within the images, and locations of the images;
identifying a first portion of the images to associate with a first image narrative based, at least in part, on a number of occurrences of individual ones of the tags and one or more of a specified time period, an activity, an event, or a friend identified by the tags; and
providing, to a computing device, data identifying the images associated with the image narrative.

17. The computer-implemented method of claim 16, wherein accessing the images associated with the first user comprises accessing a local storage of a client computing device and accessing a social networking site.

18. The computer-implemented method of claim 16, further comprising:
providing for presentation by a user interface, a first user interface element associated with the first image narrative and a second user interface element associated with a second image narrative;
receiving, from the client computing device, an indication of a selected one of the first image narrative or the second image narrative; and
providing, to the client computing device, an instruction to provide for display the selected one of the first image narrative or the second image narrative.

19. The computer-implemented method of claim 16, wherein identifying the first portion of the images to associate with the first image narrative comprise identifying one or more of: a frequently occurring scene; a frequently occurring face other than a face of the first user; or a frequently occurring activity and identifying the first portion of the images based, at least in part, on a determination that a confidence score of the first portion of the images is above a confidence threshold, the confidence score indicating a level of confidence that tags within the first portion of the images are associated.

20. The computer-implemented method of claim 16, further comprising:
identifying tags modified by the first user; and
identifying the at least the first portion of the images based, at least in part, on the tags modified by the first user.

* * * * *